United States Patent [19]

Kratochvil

[11] Patent Number: 5,009,867

[45] Date of Patent: Apr. 23, 1991

[54] C-GEL COMPOSITE PIZZA SNACK KIT

[75] Inventor: John F. Kratochvil, Oakbrook, Ill.

[73] Assignee: Kraft General Foods, Inc., Glenview, Ill.

[21] Appl. No.: 470,153

[22] Filed: Jan. 25, 1990

Related U.S. Application Data

[60] Division of Ser. No. 307,069, Feb. 6, 1989, which is a continuation-in-part of Ser. No. 658,618, Oct. 9, 1984, Pat. No. 4,684,533, which is a continuation-in-part of Ser. No. 81,115, Aug. 3, 1987, abandoned.

[51] Int. Cl.$^5$ .......................... A23L 1/04; A23C 20/02
[52] U.S. Cl. .................................... 426/128; 426/120; 426/130; 426/549; 426/575; 426/576; 426/582
[58] Field of Search .............. 426/575, 582, 601, 589, 426/656, 573, 574, 576, 120, 128, 601, 602, 613, 130, 89, 94, 19, 335, 532, 289, 302, 303, 307, 309, 310

[56] References Cited

U.S. PATENT DOCUMENTS

| | | | |
|---|---|---|---|
| 3,397,995 | 8/1968 | Elenbogen | 426/582 |
| 4,089,981 | 5/1978 | Richardson | 426/576 |
| 4,303,691 | 12/1981 | Sand et al. | 426/573 |
| 4,414,236 | 11/1983 | Moran et al. | 426/523 |
| 4,416,904 | 11/1983 | Shannon | 426/19 |

Primary Examiner—Marianne Cintins
Attorney, Agent, or Firm—Fitch, Even, Tabin & Flannery

[57] ABSTRACT

A pizza snack kit is disclosed which contains a slice of thermoreversible C-gel pizza sauce, a prepackaged cheese topping and at least one prepackaged baked pizza crust.

6 Claims, 10 Drawing Sheets 4386　　　13,000X　　　92.1 C.GEN 4397   13,000X   92.2 W/ FIBERS

C-GEL COMPOSITE PIZZA SNACK KIT

This application is a divisional of application Ser. No. 307,069 filed Feb. 6, 1989, which is a continuation-in-part of application Ser. No. 658,618 filed Oct. 9, 1984, now U.S. Pat. No. 4,684,533 and a continuation-in-part of application Ser. No. 081,115 filed Aug. 3, 1987, now abandoned, which are incorporated by reference herein.

The present invention is directed to composite food products having a firm, flavored continuous matrix and which may contain a discontinuous phase such as meat, seafood, vegetable, fruit and/or protein fibers.

BACKGROUND OF THE INVENTION

Imitation food products such as imitation cheeses are conventionally manufactured from edible components such as casein, calcium caseinate, or sodium caseinate, which permit processing at elevated temperature, and yield a firm, stable product at refrigeration temperatures.

However, casein and caseinates have the disadvantage of being relatively expensive and are subject to the vagaries of excess milk production. Accordingly, there have been substantial efforts to provide food products having decreased or minimal casein-caseinate requirements. These efforts have included attempts to develop imitation cheese products which utilize relatively inexpensive soy, cottonseed and peanut protein as a partial or total replacement for the casein-caseinate. Unfortunately, such relatively inexpensive vegetable proteins may tend to impart characteristic undesirable flavors to the food product, and also result in difficulties in the provision of desirable processing properties or product texture. Work has been carried out to produce soy proteins having more acceptable flavor for imitation cheese products, and efforts have been made to utilize carrageenan to improve the texture of imitation cheese products incorporating vegetable proteins, with combinations of soy and sodium caseinate with carrageenan being utilized in efforts to obtain various desired textures. In this regard, U.S Pat. No. 4,303,691 to Sand, et al. is directed to a proteinaceous food product intended to simulate cheese, comprising a blend of 25 percent soy isolate, cold insoluble soy fraction, or mixtures thereof, together with specified amounts of gelatin, hydrocolloid gums such as xanthan - locust bean gum mixtures and carrageenans, fat, water, emulsifiers, salt, chelating agent, coloring agent and flavoring. According to Sand, et al., the cheese-like characteristics are believed to be attributable to the combination of the hydrocolloid gum with the soy protein, neither of which materials without the other, provides a product with such characteristics.

Similarly, U.S. Pat. No. 4,089,981 describes a low calorie imitation cheese loaf featuring cellulose fibers, but also comprising minor amounts of iota carrageenan, locust bean gum, guar gum and gelatin.

There has also been substantial effort directed to development of Mozzarella cheese analogs from soy protein, gelatin, fat and a variety of gums, such as gum arabic, xanthan-locust bean gum and guar gum such as described by Yang, et al., "Morphological and Textural Comparisons of Soybean Mozzarella Cheese Analogs Prepared with Different Hydrocolloids", Food Microstructure, Vol. 1 (1982), pp. 223-231; Taranto, et al., "Morphological and Textural Characterization of Soybean Mozzarella Cheese Analogs", Scanning Electron Microscopy, III, pp. 483-492, 1981.

Improved imitation cheese compositions which employ a carrageenan-gelatin matrix ("C-Gel") having desirable economics of manufacture together with desirable flavor and performance properties including texture, meltability, shredability and sliceability, are taught by U.S. patent application Ser. No. 658,618 filed Oct. 9, 1984.

However, a variety of additional flavorful, healthful and convenient sliced or sliceable food products which employ such a C-Gel matrix would be desirable. In this regard, various food products in firm, sliced form at ambient temperature (i.e., 70–75° F.) or refrigeration temperature (i.e. 45° F.) such as pizza sauce or chili sauce food product slices which may be readily melted when heated, would be desirable as a principal component of a convenience pizza kit or hamburger topping, respectively. Similarly, firm, flavored composite food product slices such as fruit and/or chocolate flavored slices in which the structured C-Gel component is compatible with the chocolate or other flavoring ingredient, would be desirable. Moreover, sliced or sliceable products containing fruit, vegetable and/or protein components, which may be readily manufactured and processed, would also be desirable.

Accordingly, it is an object of the present invention to provide novel composite C-Gel products having excellent economy, flavor and performance characteristics. It is a further object to provide composite C-Gel products and methods for preparing such products, which incorporate wholesome food ingredients in the provision of novel highly palatable food products. These and other objects of the present invention will become apparent from the following detailed description and the accompanying drawings.

DESCRIPTION OF THE INVENTION

Figure 1:
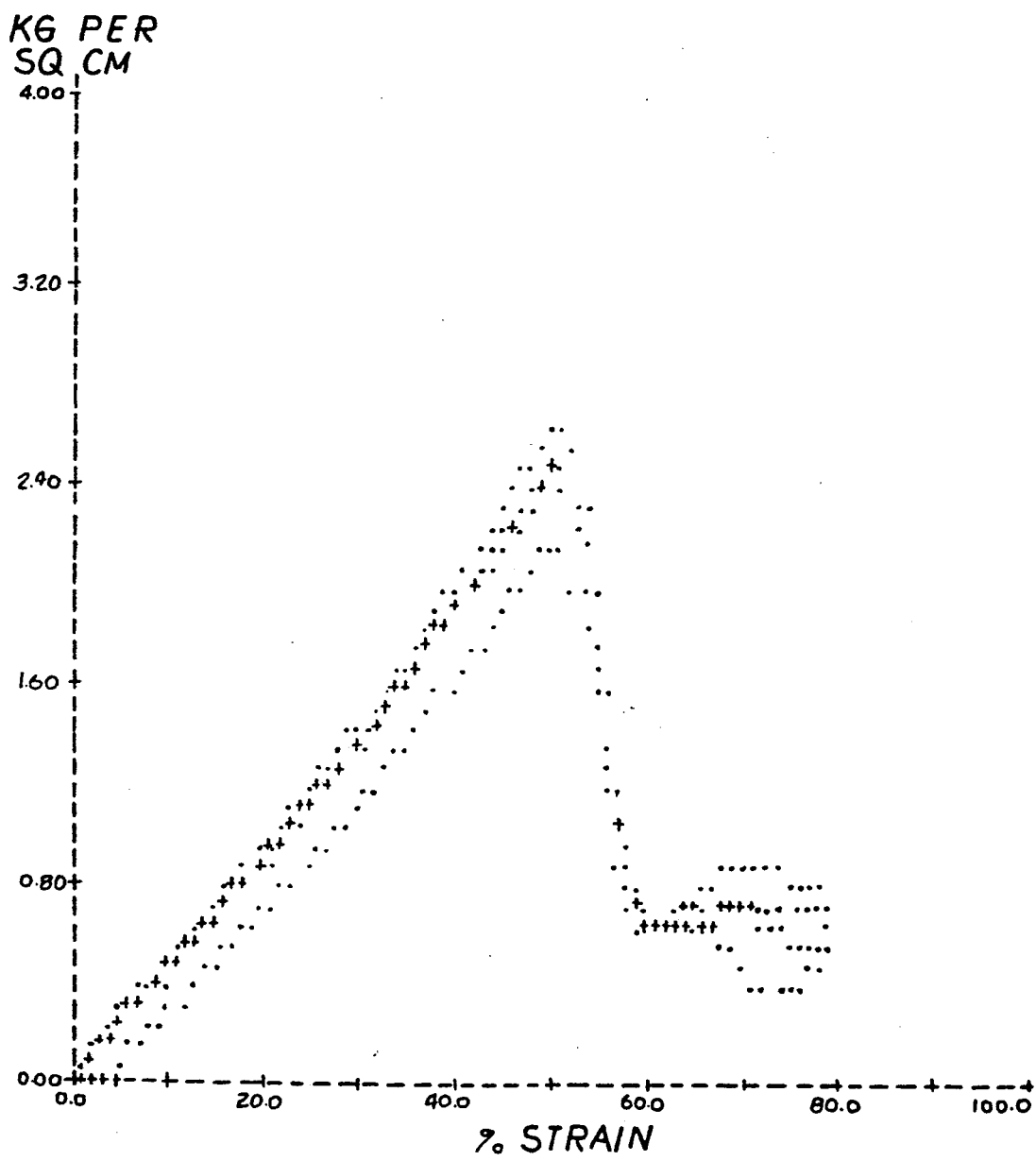
FIG. 1 is a graphic representation of the texture profile analysis force versus percent strain properties of a C-Gel matrix measured at 72° F.
Figure 2:
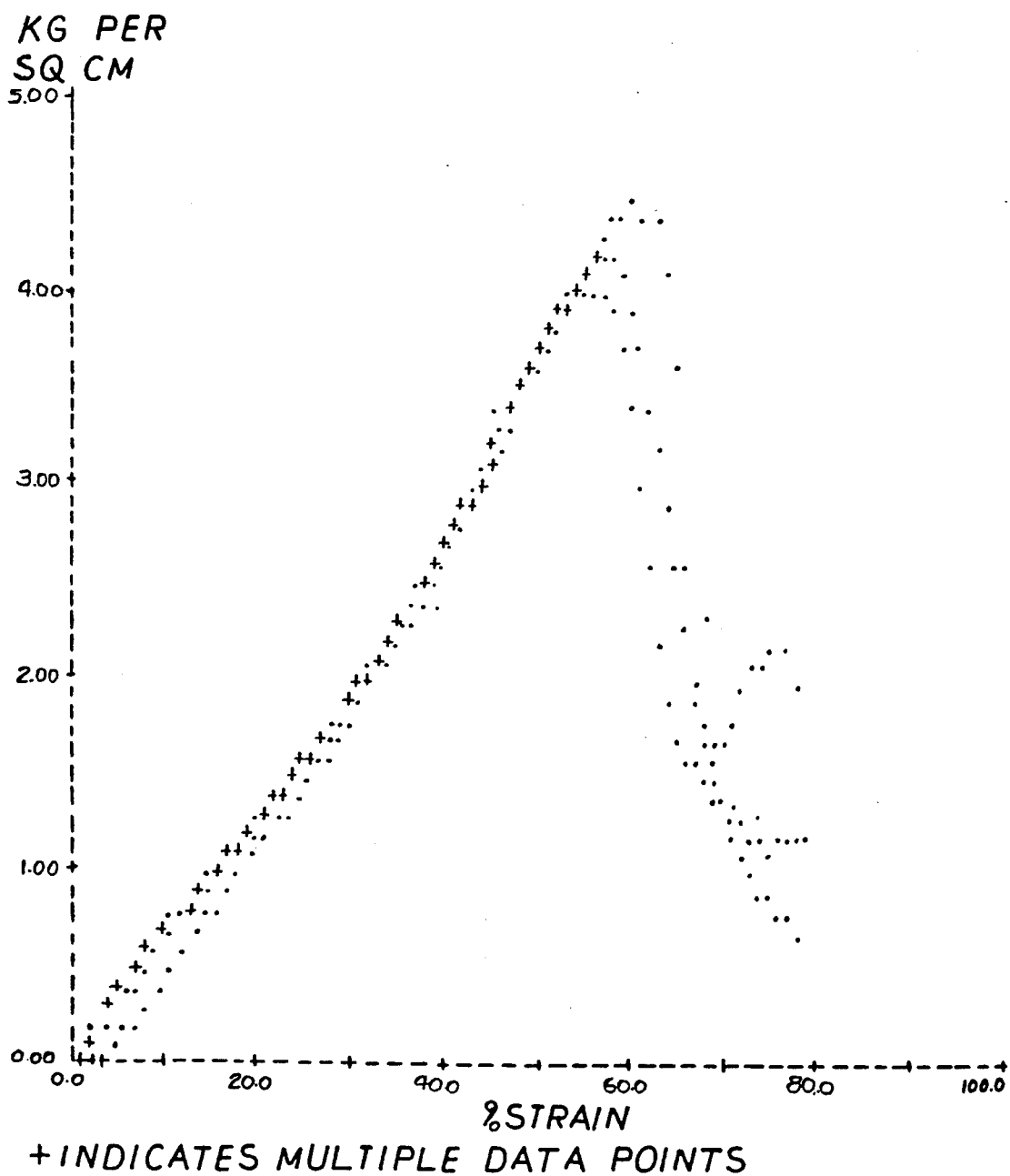
FIG. 2 is a graphic representation of the texture profile analysis force versus percent strain properties of a C-Gel matrix, measured at 45° F.
Figure 3:
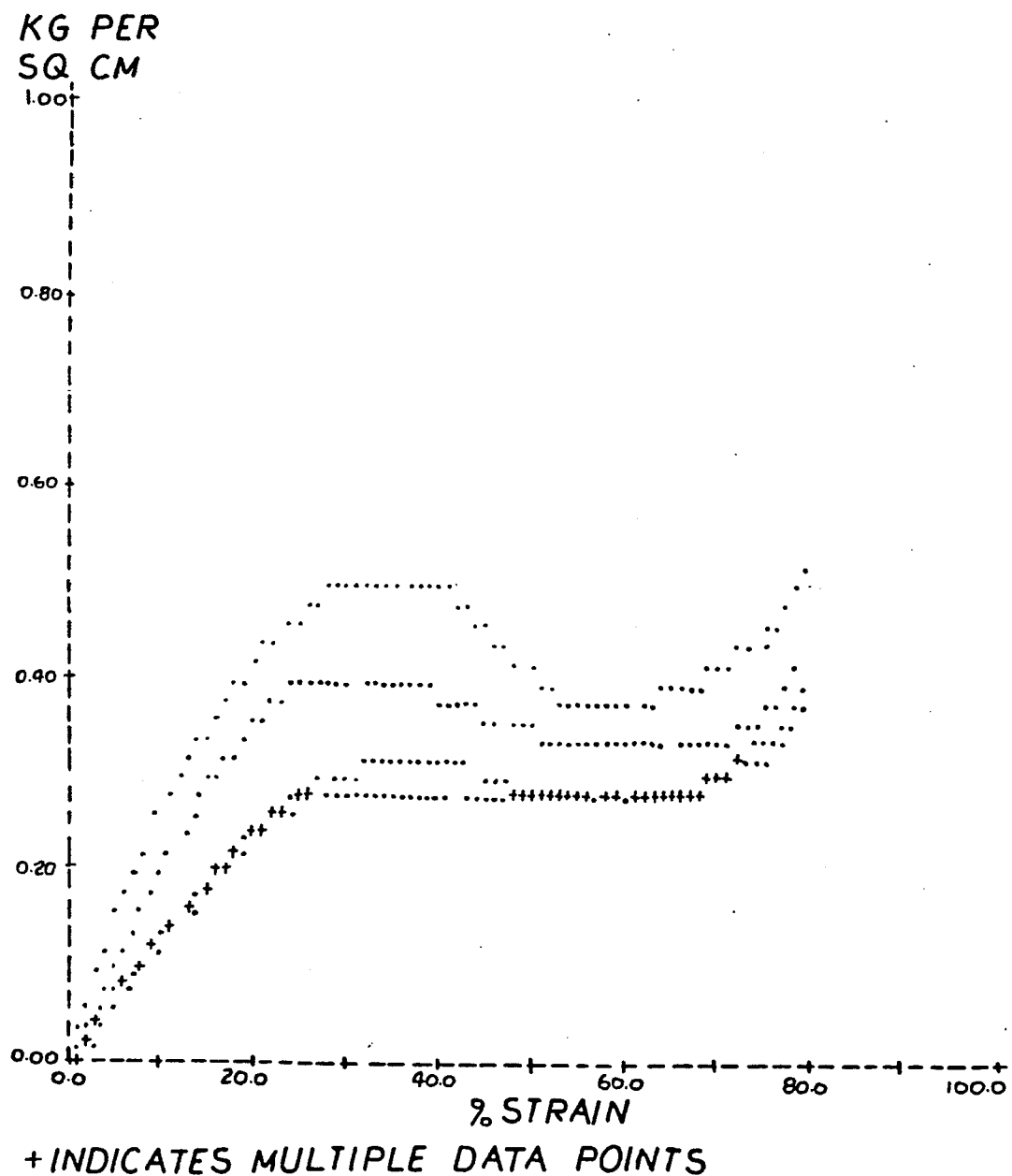
FIG. 3 is a graphic representation of the texture profile analysis force versus percent strain properties of an embodiment of a composite C-Gel product containing a xanthan protein fiber complex component in accordance with the present invention measured at 72° F.
Figure 4:
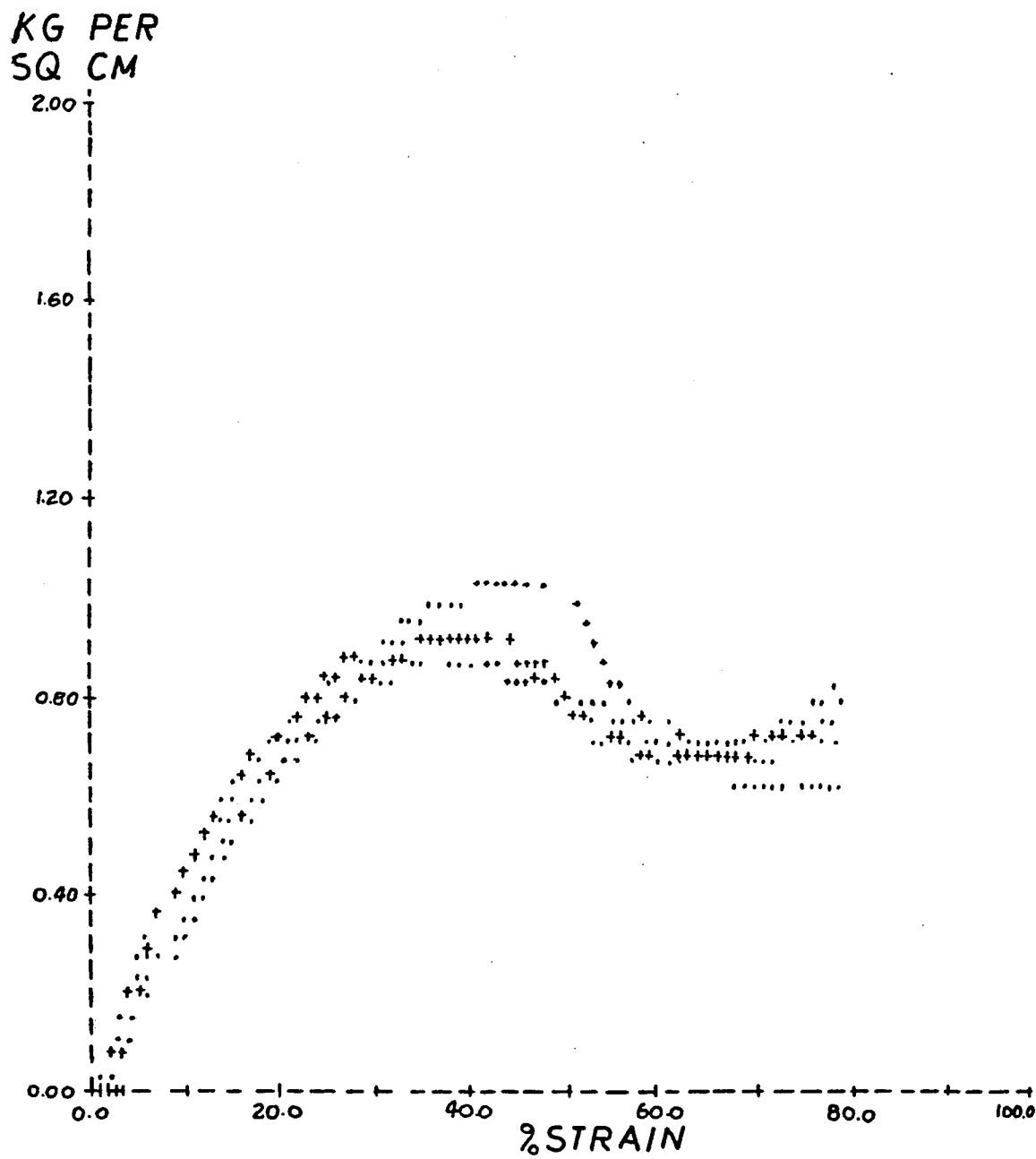
FIG. 4 is a graphic representation of the texture profile analysis force versus percent strain properties of an embodiment of a composite C-Gel product containing a xanthan protein fiber complex component in accordance with the present invention measured at 45° F.
Figure 5:
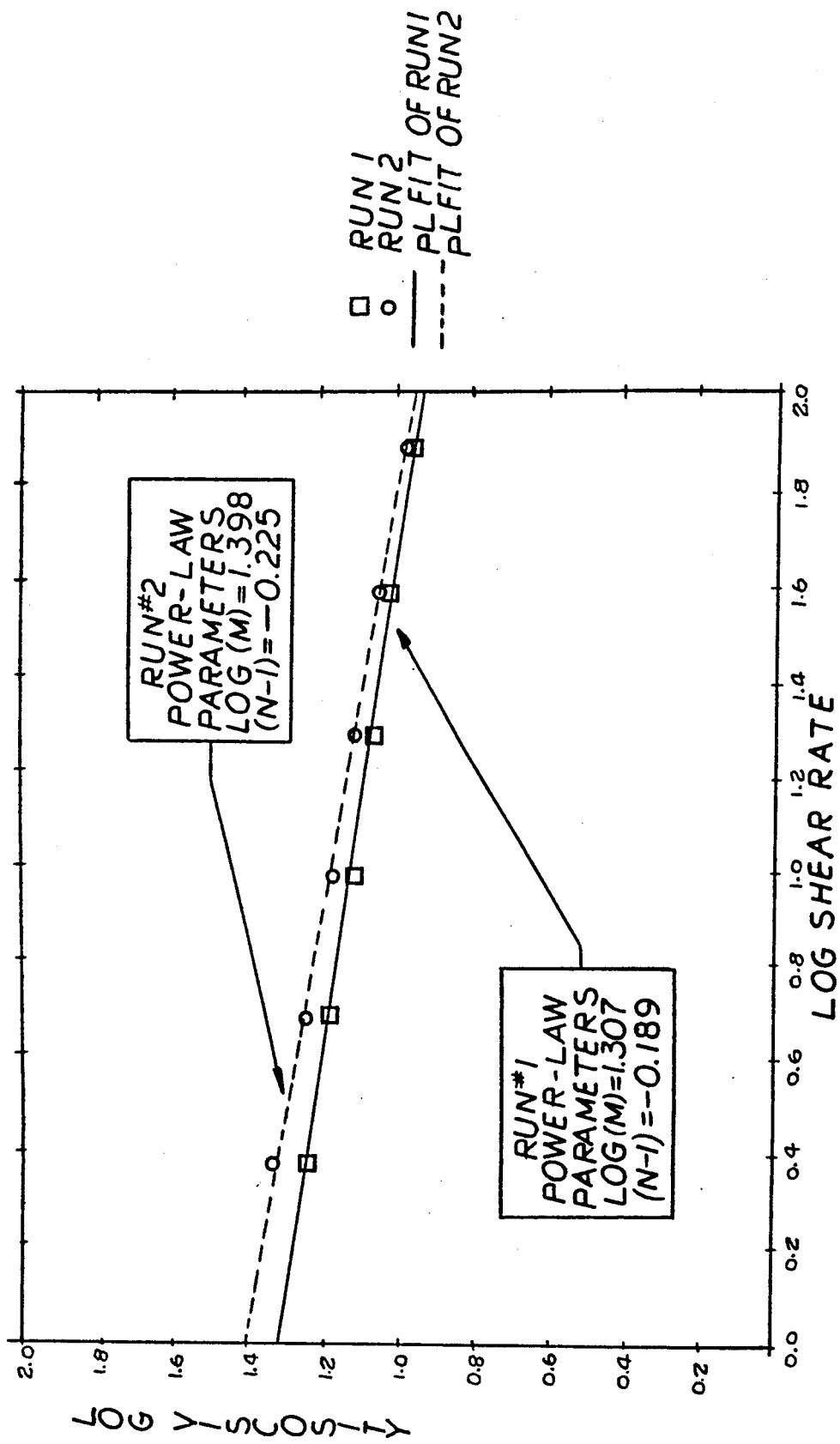
FIG. 5 is a graphic representation of the log viscosity versus log shear rate of the C-Gel matrix of FIGS. 1 and 2, measured at 80° C.
Figure 6:
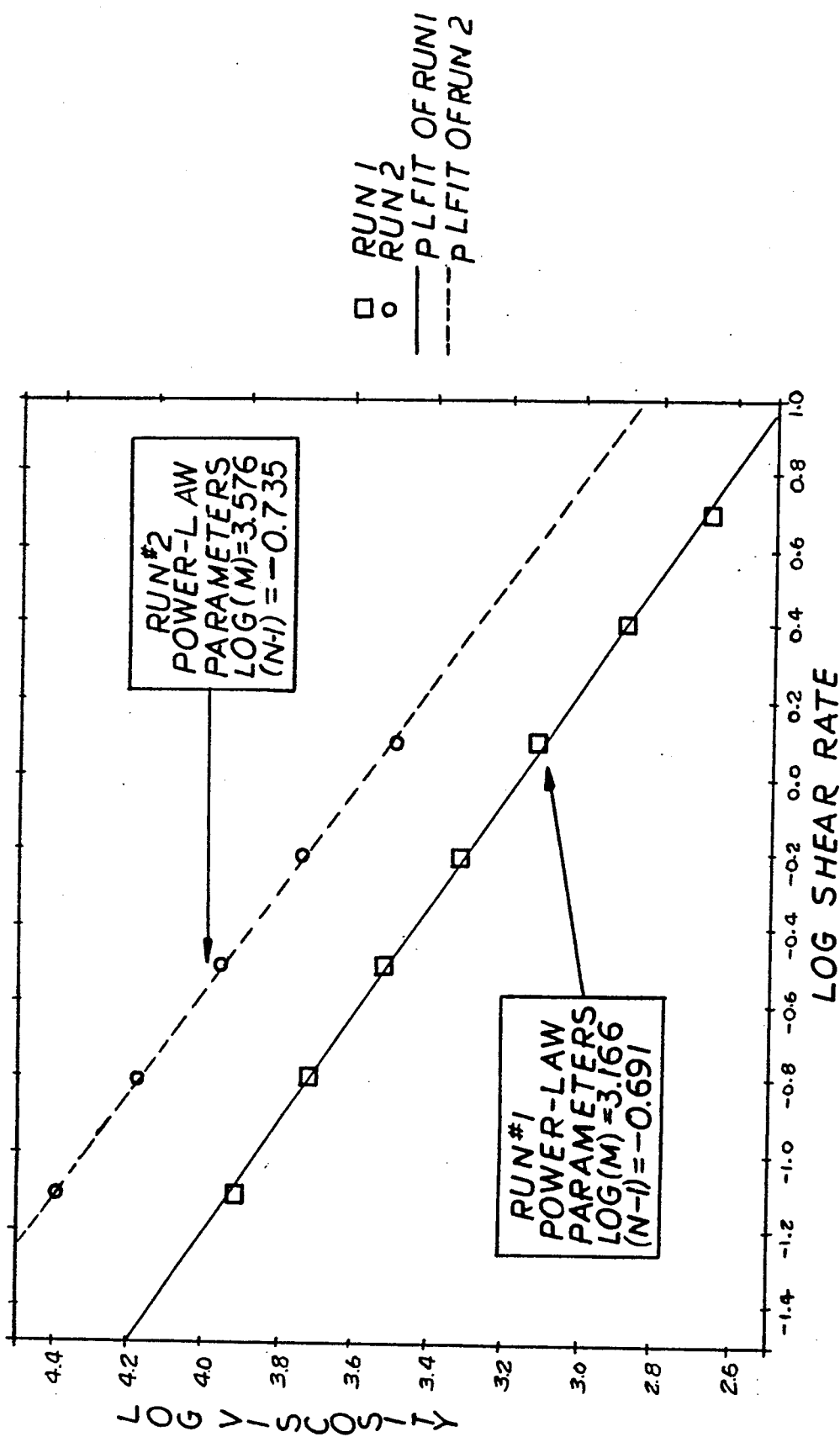
FIG. 6 is a graphic representation of the log viscosity versus log shear rate of the C-Gel composite product of FIGS. 3 and 4, measured at 80° C.

Generally in accordance with the present invention, composite C-Gel products are provided which comprise at least about 20 percent by weight of an aqueous, structurally firm, gelatin-carrageenan continuous-phase ("C-Gel") matrix, and at least about 20 percent by weight of a dispersed food component desirably selected from the group consisting of protein, fat, and carbohydrate solids, such as meats, seafoods, vegetables, fruits, sauces, dressings, protein fibers, polysaccharide/protein complex fibers, and mixtures thereof. For example, the dispersed food solids phase may desirably comprise food fibers such as synthetic xanthan-protein fibers such as disclosed in U.S. Pat. Nos. 4,563,360 and 4,559,233 or natural protein, fruit or vegetable fibers. Other polysaccharide/ protein complex fibers such as prepared from certain edible carboxymethyl cellulose materials and/or lambda carrageenan are also preferred fiber components for the composite food products of the present invention.

A dispersed fat phase, together with an emulsification agent may also be provided in the composite food products. The dispersed food solids component may be dissolved within the aqueous C-Gel matrix, or, for example in the case of fibrous components, may preferably be dispersed as a separate phase in the C-Gel product.

The C-Gel matrix, as will be more particularly described, comprises carrageenan and gelatin in a continuous aqueous phase which serves as a bland structural support and composite binding medium for other food ingredients when the product is cool (i.e., less than 75° F.) but permits the product to be mobile when hot (i.e., 160° F.). In this way, the C-Gel matrix mimics certain functional properties of casein but permits the formulation of a large number of sliced, or sliceable loaf products with little or no casein, cheese or other dairy products. Desirably the C-Gel matrix component of the composite food products in accordance with the present invention may have a structural fracturability of at least about one kilogram per square centimeter at refrigeration temperatures (i.e., 45° F.).

As indicated, the C-Gel matrix imparts mobility to the composite food product system when hot, and structural and/or binding properties to food products when cool. In addition, because the C-Gel matrix is capable of providing substantially no flavor of its own, it may serve as a carrier for almost any food ingredient without substantially altering the flavor of the ingredient. By utilizing an appropriate C-Gel matrix together with an appropriate dispersed food product, and flavoring components if desired, a large number of flavorful, healthful, and convenient sliced food products, such as sliced products for use in hot and cold sandwiches, chili hot dogs and mini pizzas, may be readily formulated and produced. The product may be aseptically packaged and have long shelf life. Loaf counterparts of such food products may also be produced, which may readily be sliced, diced, or shredded as desired.

As will be discussed in detail, in addition to the C-Gel matrix phase comprising carrageenan and gelatin, C-Gel products generally further comprise an additional dispersed phase containing vegetable or animal fat, emulsifiers, salt, flavorings and components such as, fruits, seafoods, meats, vegetables, synthetic protein-containing fibers, sauces, chocolate, and other food products which are combined with the C-Gel matrix to provide unique composite C-Gel food products.

As indicated, a principal feature of the present food compositions is a structurally firm, continuous phase gelatin-carrageenan matrix. In this regard, the composite matrix compositions in accordance with the present invention will generally comprise at least about 1.0 weight percent of medium to high bloom gelatin having a bloom strength of at least about 125, and at least about 0.5 weight percent of kappa carrageenan, based on the total weight of the C-Gel composite food product, combined as a structurally firm continuous aqueous phase matrix. The provision of a structurally firm, continuous phase matrix through the use of medium to high bloom strength gelatin, and kappa carrageenan is an important feature of the composite food products in accordance with the present invention. Firm C-Gel products may comprise at least about 1.5 weight percent of such gelatin and at least about 1.0 weight percent of kappa carrageenan.

Gelatins that may be used include medium to high bloom gelatins which are prepared by either acid or alkaline hydrolysis. Gelatin is conventionally provided by selective hydrolysis of collagen, a major intercellular protein constituent of connective tissue. Gelatin consists of a mixture of suitable proteins of high average molecular weight that are capable of forming a firm gel in an aqueous medium. Medium to high bloom strength gelatin will generally have a relatively high weight average molecular weight, such as at least about 100,000.

As indicated in accordance with the present invention, C-Gel composite food products are provided comprising a gelatin-carrageenan continuous phase matrix which is structurally firm at refrigeration temperatures, and in this regard the gelatin should be present at a level of at least about one weight percent based on the total weight of the composition. In some C-Gel composite food products, the preferred gelatin level may be as high as 12 weight percent, depending on the desired level of firmness in the selected composite C-Gel product.

Also important in the C-Gel matrix of the composite food products of the present invention is the provision of a kappa carrageenan component which, with the medium to high bloom strength gelatin, participates in the formation of the structurally firm continuous C-Gel phase of the composite food compositions. There are three general varieties of carrageenans including the kappa variety, the lambda variety and the iota variety. Kappa carrageenan is a necessary component in the continuous phase matrix of the gelled compositions of the present invention. Kappa carrageenan is one of the three principal forms of carrageenan. It is believed to be a hydrocolloid mainly consisting of a copolymer of alternating D-galactose (4) sulfate ester and 3,6 anhydro-D-galactose units, which may exist as a salt with potassium, sodium, magnesium and calcium ions. A small percentage of the 3,6 anhydro-D-galactose units are sulfated in the 2 position. In certain products, some lambda and/or iota carrageenan may be utilized in addition to the kappa carrageenan to impart special characteristics such as smoothness, but the kappa carrageenan-gelatin matrix is the principal structural and/or binding component.

The carrageenan should be present in the continuous C-Gel matrix in an amount of at least about 0.5 weight percent based on the total weight of the C-Gel composite product. In some C-Gel composite food products, the preferred carrageenan range is from about 1.0% to about 3.0% of the total weight of the C-Gel composite food product. In addition, the weight ratio of the carrageenan to the gelatin component should be in the range of from about 1:6 to about 3:1, on a dry basis.

An important component of the composite C-Gel products is the dispersed food product. Particular preferred C-Gel composite compositions may include fruits, vegetables, meats or other protein fibers, or mixtures thereof.

Composite C-Gel compositions which contain meat or other protein fibers or ionic polysaccharide-protein fibers are particularly preferred compositions in sliced form. The type of meat, protein or other fiber components which may be utilized in the fiber composite C-Gel products of the present invention include beef, pork, seafood, poultry such as chicken and turkey, and fish protein such as surimi, and mixtures thereof. Fibers of egg proteins, vegetable proteins such as soy protein and cottonseed protein, dairy proteins such as casein and whey proteins and microbial protein such as yeast protein and mixtures thereof may also desirably form a dispersed fiber component in the preferred C-Gel composite product in accordance with the present invention. Particularly preferred fiber compositions include fibrous complexes of an anionic polysaccharide with a protein, such as the xanthan protein complex fibers disclosed in U.S. Pat. Nos. 4,563,360 and 4,559,233 which are incorporated herein by reference. Ionic polysaccharide-protein complex fibers may also be prepared comprising lambda carrageenan and/or carboxymethyl cellulose complexed with various proteins. In this regard, methods for manufacturing edible, stable polysaccharide/protein complex carboxymethyl cellulose fiber compositions which have a fibrous body and texture, through the use of high molecular weight, highly substituted food grade carboxymethyl cellulose as a protein complexing component, may desirably be used to prepare polysaccharide/protein complex fibers for fibrous C-gel composite products.

Methods for edible carboxymethyl cellulose/protein fiber manufacture may comprise the steps of providing an aqueous protein fiber generating solution comprising a solubilized edible protein polymer component. The protein component will desirably be an undenatured animal or vegetable protein, which is preferably undenatured, or mixtures thereof.

For example, the fibers may be provided from an aqueous protein fiber generating solution of vegetable or animal proteins, or mixtures thereof. Such a protein fiber generation solution may, for example, comprise a solubilized edible protein polymer component selected from the group consisting of soy protein (particularly including soy protein isolate), casein, egg protein, peanut protein (particularly including peanut protein isolate), cottonseed protein (particularly including cottonseed protein isolate), sunflower protein (particularly including sunflower protein isolate), pea protein (particularly including pea protein isolate), whey protein and other seafood protein, animal protein and mixtures thereof. Cereal and grain proteins alone or in combination with other cereal, grain or other proteins, which may be solubilized in water, are useful protein components. In this regard, the water soluble proteins (albumins), salt soluble proteins (globulins), alcohol soluble proteins (prolamins and gliadins) and acid and alkali soluble proteins (glutelins) of cereals and grains such as corn, barley, wheat, buckwheat and oats are contemplated herein as protein sources. For example, zein, the prolamin protein of corn, may be readily obtained by dissolution in aqueous alcohol from corn gluten, and becomes soluble in dilute aqueous alkalai (e.g., 0.02 to 0.2 normal NaOH). The various protein components may be utilized to produce aqueous microfragment dispersions of varied properties. For example, polysaccharide complexes with egg albumin readily denature at elevated temperature to stabilize the complex. The high proportion of nonpolar and acid amide side chains of prolamins such as zein may be utilized alone or with the proteins in forming polysaccharide complexes, to provide aqueous dispersions of varied, useful properties. One or more of these aqueous solubilized undenatured protein components may desirably comprise at least about 50 weight percent of the solubilized proteins, based on the total weight of the solubilized protein, for preparing microfragmented complex dispersions for a variety of uses. Gelatin may also be included in amounts (e.g., 20 weight percent based on the total dry weight of the protein component) which do not prevent fiber formation.

Egg white protein, casein (e.g., as sodium caseinate), soy protein isolate and mixtures of soy protein isolate and egg albumin are particularly preferred edible protein polymer components. Whey protein is a readily available protein which may be used alone or in combination with other proteins. By "solubilized protein" is meant a protein that is hydrated by existing either in true solution (single phase) or in a stabilized dispersion which upon initial dispersion in water may appear to be a single phase but after a period of time may separate into two phases. By "solubilized undenatured protein" is meant a solubilized protein having its natural secondary and tertiary structure substantially intact. For example, unheated egg white may be solubilized in water, yet still retains an ordered structure in which hydrophilic amino acid groups such as serene, lysine, aspartic acid and glutamic acid tend to be exposed to the aqueous solvent, while hydrophobic amine acid groups such as leucine, isoleucine, phenylalanine groups tend to be associated or otherwise oriented away from contact with water. The solubilized undenatured edible protein component will desirably have an isoelectric point(s) greater than about 3, preferably in the range of from about 4 to about 10. Particularly useful proteins may have an isoelectric point in the range of from about 4 to about 7. In this regard, typically soy protein isolate may have an isoelectric point of about 4.5, egg albumin of about 4.7 and casein of about 4.5. It is noted that various constituents of the solubilized edible protein component may have different isoelectric points. However, it is important that the various protein components when complexed with the highly substituted carboxymethyl cellulose component may form fibrous complex precipitates at a preselected reaction pH which is determined by the isoelectric point of the fibrous complex. In this regard, particularly preferred compositions in accordance with the present invention include multiple protein complex fibers such as fibers of highly substituted carboxymethyl cellulose complexed with casein, whey protein or soy protein, together with egg albumin. Such proteins and aqueous fiber generating solutions may also be used with xanthan gum and lambda carrageenan to form fibers for use in composite food products.

A protein is desirably solubilized at a pH of at least about 1 pH unit from its isoelectric point, and preferably at 2 pH units or greater from its isoelectric point.

In preparing carboxymethyl cellulose/protein complex fibers, the fiber generating solution further includes a solubilized high molecular weight, highly substituted food grade carboxymethyl cellulose polymer component. By high molecular weight, highly substituted food grade carboxymethyl cellulose is meant cellulose, which is a poly (glucose) saccharide, having an average degree of substitution of carboxymethyl groups on the hydroxyl groups of the anhydro-D-glucopyranose units of the cellulose in the range of from about 0.8 to about 1.0, and preferably about 0.9 and having a weight average molecular weight of at least about 100,000 daltons. Commercial food grade sodium carboxymethyl cellulose may have an average degree of carboxymethyl substitution between 0.4 and 0.9; however, it has been determined that carboxymethyl cellulose having an average degree of carboxymethyl substitution of 0.7 or less does not readily form fibers under the conditions of the present methods. While a degree of substitution of up to 3.0 may be provided, materials having a degree of substitution over 0.9 are not approved for food use by the U.S. Food and Drug Administration. The properties of sodium carboxymethyl cellulose can be controlled by varying the uniformity of substitution, the degree of substitution (D.S.) and the molecular weight. A discussion of the physical and chemical properties of various carboxymethyl cellulose components may be found in Industrial Gums, R. L. Whistler, Ed., Academic Pres, N.Y. (1973), p. 643.

As indicated, carboxymethyl celluloses having a relatively low degree of carboxymethyl group substitution do not provide fibrous protein complexes in accordance with the present invention. However, by utilizing carboxymethyl cellulose having a degree of substitution in the range of from about 0.8 and about 1.0, and more preferably about 0.9 stable fibrous complexes may be prepared in accordance with the method aspects of the present invention, which may be utilized to contribute a fibrous or meat analog characteristic to food products, or which may be microfragmented after stable fiber formation to provide smooth, creamy aqueous microfragment dispersions, as will be described hereinafter.

In aqueous solution, the highly charged mutually repelling carboxymethyl side chains, which are disposed along the cellulose backbone, are believed to provide the highly substituted carboxymethyl cellulose with a relatively linear structure, which is further believed to be an important factor in the provision of fiber complexes in accordance with the present invention.

A relatively high molecular weight is also believed to be an important factor in complex fiber formation. In this regard, carboxymethyl cellulose (albiet not a food grade material), having a degree of substitution of about 1.2, but a relatively low molecular weight of 70,000 daltons has failed to form fibers under these conditions which produce fibers using the appropriate carboxymethyl cellulose as previously described.

The highly substituted, high molecular weight carboxymethyl cellulose components may be used with xanthan gum or with other anionic polysaccharide gums such as kappa, lambda or iota carrageenans, pectins, alginates and mixtures thereof in amounts which do not prevent fiber formation. When used with other complex fiber-forming polysaccharides such as xanthan gum and/or lambda carrageenan, the relative proportions of carboxymethyl cellulose may vary over a wide range, and the carboxymethyl cellulose may be of "border line" fiber forming capability. When the high molecular weight food grade highly substituted carboxymethyl cellulose is dissolved with non fiber-forming anionic polysaccharides in the fiber-forming solution, the highly substituted high molecular weight carboxymethyl cellulose should desirably comprise at least about 50 weight percent of anionic polysaccharide components.

The protein fiber generating solution may be provided in any suitable manner, as by preparing and subsequently combining separate protein component and highly substituted food grade carboxymethyl cellulose solutions, and by initially preparing a solution comprising both components. The fiber generating solution should contain a solubilized protein component and highly substituted carboxymethyl cellulose component in a particular composition range, and in this regard, the total solubilized protein and highly substituted carboxymethyl cellulose components should be in the range of from about 0.1 weight percent to about 10 weight percent, and preferably from about 4 to about 6 weight percent based on the total weight of the aqueous fiber generating solution. Carboxymethyl cellulose is typically less viscous than xanthan gum, and may be used in higher concentration under various conditions while still providing fibrous complexes.

The aqueous fiber forming solution may further include other components, including other dissolved or suspended protein components, flavoring agents, preservatives and hydrocolloids.

The complex forming solution may also include water solubilized, substantially nonionic edible polysaccharides such as dissolved starch, solubilized agar and agaroids, dissolved guar gum, dissolved carob gum, water soluble dextrans, water or alkali soluble edible grain bran and/or hemicellulose constituents such as solubilized what gum, solubilized what bran, solubilized oat bran and solubilized corn bran constituents, as well as mixtures of such nonionic polysaccharides. Such nonionic polysaccharide components, which are dissolved in the complex forming solution together with the xanthan gum and protein polymer components, may become entangled and enmeshed with the ionic polysaccharide/protein complex which is formed upon pH adjustment of the complex forming solution. The amount of the nonionic polysaccharide component which is included in the complex forming solution and the resulting complex will depend upon the particular nonionic polysaccharide, or mixture of polysaccharides, and the desired properties of the fibers or microfragmented aqueous dispersion to be prepared from such fibers. The nonionic polysaccharide component will typically tend to increase the water content of the polysaccharide/protein complex. It is desirable that the complex contain at least about 15 weight percent of solids, and preferably for a variety of uses, at least about 20 weight percent solids, and the amount and type of nonionic polysaccharide may be adjusted to provide a desired solids level.

Starch may be included in relatively high quantities, while high viscosity water retaining materials such as agar may be included in relatively small amounts, such as from about 0.1 to about 2 percent based on the total weight (dry basis) of the fiber.

Substantially fully hydrated starch is a particularly desirable nonionic polysaccharide component in view of its relatively bland taste, relatively low caloric content when hydrated, and its price-performance effectiveness. Starch may desirably be included in the complex forming solutions, and in the precipitated complexes, in amounts of from about 1% to about 75% by weight, based on the total weight of the polysaccharide/ protein complex on a dry basis. For various uses, the starch will preferably be included in the precipitated complexes (to be used in the dispersed phase of the C-gel composite food products) in an amount in the range of from about 25 percent to about 60 percent by weight, based on the total weight of the complex on a dry basis.

Starch components may include amylose, amylopectin and mixtures thereof. Useful starch components include corn starch, potato starch and tapioca starch. Amylopectin and high amylopectin starches such as waxy maize starch and waxy milo starch may be dissolved and introduced into the fiber generating solution prior to pH adjustment for complex formation, to provide high molecular weight starch components which entangle readily with the xanthan gum polymer and solubilized protein polymer components upon precipitation. Fully gelatinized amylose and high amylose starch sources such as obtained from high amylose corn varieties containing at least 75% by weight amylose based on the total starch content, may also be utilized. Such amylose has a linear structure which is subject to retrogradation The linear amylose molecules can interact and associate with one another to contribute to the interlacing network extending through the xanthan/ protein complex, and contribute to the syneresis of water from the complex. Corn starch, which is a mixture of amylose and amylopectin, may be desirably included in the fiber forming solution in amounts ranging up to about two times the total weight of the ionic polysaccharide components.

It is noted that when using unrefined natural sources of neutral polysaccharides or proteins, or both, it may be desirable to separate undissolved solids from the complex forming solution prior to pH adjustment to achieve complex formation. Such separation may be readily carried out by filtration or centrifugation to remove substantially all undissolved solids. Preferably, at least about 99 percent, and more preferably at least 99.9 percent by weight of the solids in the complex forming solution, will be dissolved or solubilized therein immediately prior to pH adjustment to initiate complex formation. Fully gelatinized, or dissolved starch is regarded to be solubilized for such purposes.

However, the amount of such components for certain uses should best not exceed the total amount of the specified protein component and the highly substituted carboxymethyl cellulose component, and in any event, for purposes of producing meat-like fibers, such additional materials should not be included in amounts which significantly interfere with or prevent fiber formation. Further in accordance with the method, the pH of the fiber generating solution is adjusted to a pH at which the components form a complex, which is preferably within about 2 pH units of an optimum isoelectric pH for the desired complex, to form a fibrous protein-polysaccharide complex under conditions of mixing of the fiber forming solution.

In this manner, hybrid protein complexes may be formed which have a fibrous-meat like texture. The fiber formation may occur over a range of pH approaching the isoelectric point of the particular highly substituted carboxymethyl cellulose/protein complex. In this regard, for example, for a high molecular weight, highly substituted carboxymethyl cellulose/egg protein fiber/ sodium caseinate complex, fiber formation may begin near neutral pH and increases as the pH is adjusted to or near to the isoelectric point of the complex, which typically may be in the range of from about 1 to about 5. The fiber formation is spontaneous and does not require the use of spinning equipment. Moreover, the fibrous network synereses (exudes water), which is desirable in the minimization of energy intensive drying steps. The fibers under some processing conditions (e.g., when air is beaten into the fiber slurry) may be less dense than the aqueous phase and thus float to the surface for harvesting by skimming the surface of the reaction vessel or draining away the aqueous phase from below such fibers, as in a standard cheese vat. The separation of the fibrous high molecular weight, highly substituted carboxymethyl cellulose/protein complexes from the liquid phase, removes salts and undesirable flavor components from the protein-complex, while at the same time concentrating the protein component. Once the fibers are formed, they are relatively stable to a range of salt and pH conditions about the isoelectric point of the complex, but have stability limitations and may readily be redissolved under appropriate conditions. In accordance with the present invention, the fibers are further processed by heating to stabilize the complex, as will be described hereinafter.

The texture of the carboxymethyl cellulose/protein complex fibers may be controlled by varying the ratio of the fiber forming polysaccharide component versus the protein component. The desired fiber forming polysaccharide to protein weight ratio is within the range between 1:2 and 1:15, and more preferably in the range of from about 1:4 to about 1:10.

The adjustment of pH to form fibers from the highly substituted carboxymethyl cellulose/protein mixture may be carried out in a variety of ways. In this regard, the protein fiber generating solution may be provided at a pH significantly above the isoelectric point of the protein complex fibers, and subsequently reduced in pH toward its isoelectric point. This pH reduction may be carried out for example by removal of a cationic counterion (e.g., Na+) of the solubilized highly substituted carboxymethyl cellulose/or protein component as by electrophoresis, or by addition of an edible or food grade acid such as hydrochloric acid, phosphoric acid, acetic acid, citric acid, ascorbic acid, lactic acid, carbonic acid (e.g., via carbon dioxide) or mixtures thereof. The acid appears to protonate both the carboxylate and the amino groups of the protein to make the protein less negatively charged so as to link the polymeric chains of the very negatively charged highly substituted carboxymethyl cellulose, to form an ionic polysaccharide protein complex that has a fibrous network. Adjustment of pH may also be carried out by other appropriate techniques such as by combining an aqueous solution of the protein component at a predetermined pH at which the protein component is solubilized with an aqueous solution of the highly substituted carboxymethyl cellulose component at a predetermined pH at which it is solubilized, such that upon combination the resulting solution has a predetermined pH at or near the isoelectric point of a desired highly substituted carboxymethyl cellulose/protein fibrous complex. In this regard, it will be appreciated that the protein component may be provided in aqueous solution in broad ranges of pH at higher and lower pH than its protein isoelectric point(s), and the highly substituted carboxymethyl cellulose, which has substantially only anionic carboxylic groups may also be provided in aqueous solution over a broad range of pH. It will also be appreciated that the pH may be adjusted by selective anion removal from a combined solubilized protein and highly substituted carboxymethyl cellulose solution having low pH, in order to raise the pH to a value approximating the isoelectric point of a desired protein component-highly substituted carboxymethyl cellulose fibrous complex, or an edible food grade base, such as sodium hydroxide may be added to such solubilized acidic mixtures.

The fibrous complex reaction is completed or maximized when the highly substituted carboxymethyl cellulose/protein mixture is adjusted to a pH at which the electrophoretic mobility of a desired highly substituted carboxymethyl cellulose/protein mixture is substantially zero. Electrophoretic mobility may be measured using conventional analytical instruments such as a System 3000 electrokinetic analyzer manufactured by PenKem, Inc., Bedford Hills, N.Y.

Because the salt balance affects the electrical charge on the protein and highly substituted carboxymethyl cellulose, and because the electrical charge on these polymers affects their interaction with each other, the manipulation of molecular electrokinetic properties is important to the control of the texture of their complex interaction product. By adjusting the pH of the fiber generating solution containing two or more protein and highly substituted carboxymethyl cellulose polyelectrolytes of opposite principal polarity, so that the pH is below the isoelectric point of at least one of the polyelectrolytes, a reaction among the various polyelectrolytes may be carried out, particularly when the net charge of the electrolyte with high pI is positive and that of the other polyelectrolyte is negative. Although it is desirable that opposite net charges be achieved, it is not required.

The isoelectric points of the specified protein component and the highly substituted carboxymethyl cellulose component may have widely different values, for example, the isoelectric point of a soy protein isolate component may typically be about pH 4.4, while highly substituted carboxymethyl cellulose, because it may have substantially only pendant anionic carboxylic acid ionic species, has an effective electrical charge even at pH 2.5. Highly substituted carboxymethyl cellulose complexes with soy protein will have intermediate isoelectric points, depending upon the relative proportions of each in the complex. Optimal points for hybrid complex formation may be determined by measuring the isoelectric points of desired complexes, which may be carried out by measuring the isoelectric point values separately for the reactants, and adjusting the mixture pH to a value intermediate to the individual pI to form a sample of the desired complex. The pI of the complex thus formed may be measured to determine a desired pH for the complex formation as the control point of the reaction to maximize product yields and achieve the desired fibrous food texture. It will be appreciated, as will be further discussed, that the isoelectric point of a protein/highly substituted carboxymethyl cellulose complex may vary depending upon the respective proportions of the components of the complex.

The shape and size of the highly substituted carboxymethyl cellulose/protein complex fibers may be controlled by the degree of shear or mixing applied to the fiber forming solution during pH adjustment. For example, long, large and nonordered fibers may be prepared under conditions of relatively low shear mixing, while short, fine and uniform fibers may be obtained under conditions of relatively high shear mixing during adjustment of the solution pH to the desired fiber-forming value.

After formation of the highly substituted carboxymethyl cellulose/protein complex fibers, it is important to heat the fibers to stabilize them in fiber form so that they are capable of withstanding a broad range of pH, mechanical shear and ionic conditions, as well as stability in interaction with a broad range of other food components. Such stabilization may be carried out by heating the fibers to a temperature of at least about 70° C. for at least 30 seconds or equivalent time temperature relationships, and more preferably at least about 95° C. for at least about 5 minutes to denature the protein within the complex at least about 40 percent, and more preferably at least 90% to stabilize the complex. Such denaturation may be readily measured by differential scanning calorimetry ("DSC"). Desirably the fibers will be heated to a temperature of about 100° C. as by boiling in water or steam injection, for at least about 5 seconds, (e.g., 3-5 minutes) to substantially fully denature the protein component of the complex. The heat dependence of denaturation will typically vary with pH, with the complex being easier to denature at lower pH values. By "denatured" is meant loss of native secondary and tertiary structure, such as measured by DSC. Denaturation may result in substantial disulfide crosslinking, as measured by gel electrophoresis, which will also help stabilize the complex.

Having generally described polysaccharide/protein complex fiber manufacture, a specific preparation will be described. An aqueous protein solution such as a mixture of undenatured egg white and undenatured whey protein concentrate and/or whey ultrafiltration retentate solution is provided at a protein concentration of 8.0 weight percent. Similarly, a highly carboxymethyl substituted cellulose solution having a weight average molecular weight of about 150,000 and a degree of substitution of about 0.9 is prepared by dissolving highly carboxymethyl substituted cellulose in water, at a level of about 1.0 weight percent. The solutions may be combined in desired ratio to provide a fiber generating solution having about 4 weight percent protein and 0.5 weight percent highly carboxymethyl substituted cellulose at a pH of about 6.5. Alternatively, the components may be combined directly with water to form the solution.

The pH, ionic strength, highly carboxymethyl substituted cellulose/protein ratio, percent total solids, temperature, mode of mixing and stirring and rate of acidification are important factors for synthesizing fibers of highly carboxymethyl substituted cellulose-protein complexes, utilizing the fiber generating solution. Such pH adjustment may be carried out by addition of hydrochloric acid to protonate the protein component so that the repulsion between the two polymers can be minimized, and so that electrostatic interaction can take place to provide fibers and a whey phase which may be separated by appropriate means.

The weight percent total solids of the fiber generating highly carboxymethyl substituted cellulose/ protein solution in water may typically be varied within the range of from about 2 weight percent to about 8 weight percent, based on total solution weight. The water content of the fiber generating solution (as well as the ionic strength) is important for the complexed polymers to form a fibrous network. Fiber formation should desirably be carried out at a temperature which is less than the denaturation temperature of the protein component.

The mode of mixing or agitation of the fiber-forming solution while carrying out the pH adjustment is also an important factor in formation of fibers. Different types of blades and/or different speeds of stirring may be utilized to provide different shapes and sizes of fibers. For example, large, long fibers may be obtained by using a Hobart blender at a slow speed (e.g., 90–120 rpm) while acidifying the fiber-forming solution. On the other hand, fine, short fibers may be obtained while stirring the highly carboxymethyl substituted cellulose-protein mixture in a Waring blender at a medium speed upon acidification.

The whey separated from the fiber composition may contain inorganic salts resulting from the pH adjustment step, and may contain a small amount of highly carboxymethyl substituted cellulose or other components, particularly if a blend of carboxymethyl cellulose and another, less efficient anionic polysaccharide is used as the anionic complexing agent. However, the carboxymethyl cellulose is a highly efficient complexing agent, which minimizes uncomplexed protein and/or carboxymethyl cellulose in the whey component. The inorganic salts may be removed, at least in part by appropriate means such as through the use of selectively permeable membranes, electrodialysis and/or ion exchange resins, to provide a deionized whey, which may be utilized in the provision of the protein and highly carboxymethyl substituted cellulose solutions. However, carboxymethyl cellulose is such an efficient complexing agent that such recyclic operation is generally inappropriate. The fiber composition product has a distinct fibrous character, and may be incorporated in C-gel products.

Although the specific preparation method has been particularly described with respect to whey protein - egg white/highly carboxymethyl substituted cellulose complex fibers, other water soluble proteins may also be included in the whey protein complexes to form meat-like fibers. In this regard, for example, casein such as provided by skim milk powder or as sodium caseinate, vegetable proteins such as peanut protein isolate or soy protein isolate, may be utilized in combination with the whey protein as the solubilized protein component to form fibrous hybrid protein complexes which are relatively bland and differ in color and/or texture.

A desirable feature of the present disclosure is that several proteins may be utilized with highly carboxymethyl substituted cellulose to form multiple protein-highly carboxy substituted cellulose complexes. For example, the fibrous ternary complexes of soy-highly carboxymethyl substituted cellulose-whey protein isolate may be provided in which the ratio of the protein components is varied to provide desired fibrous products having a corresponding variety of characteristics. As also indicated, the complexes may comprise a highly carboxymethyl substituted cellulose mixture with other ionic polysaccharides, such as xanthan gum, and non fiber forming carboxymethyl cellulose compositions. Such highly carboxymethyl substituted cellulose - polysaccharide blends may be selected not only for reasons of economy, but also to vary the texture of the fibers. Similarly, fibrous multiple highly carboxymethyl substituted cellulose - multiple protein complex fibers including whey protein may be prepared by using the appropriate starting components.

Utilization of various protein components and component blends permits manufacture of synthetic meat-like protein fibers which differ in color, firmness and flavor depending on components and processing variations. The fiber complexes of vegetable proteins such as soy isolate, with whey protein, are functionally nutritious and may substantially completely suppress undesirable vegetable protein flavor components.

Upon formation, the complexed highly carboxymethyl substituted cellulose-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 60 to about 80 weight percent moisture, and typically about 65 percent by weight moisture. The press dried fibers may be flavored by immersing them in a suitable favoring agent such as pork, lobster, crab, chicken or beef extract to obtain desired, chewable meat-like products having meat simulating flavor and texture.

At acidic pH, the basic groups of the protein, namely the lysine, arginine and histidine residues are protonated and positively charged. In contrast, the highly carboxymethyl substituted cellulose is still negatively charged at the reaction or interaction pH. As a result, the highly carboxymethyl substituted cellulose and the protein interact spontaneously by electrostatic attraction which is controlled by the pH, the ionic strength, the isoelectric point of the protein and the pKa of the highly carboxymethyl substituted cellulose.

The undenatured fibers of highly carboxymethyl substituted cellulose/protein complex may soften or redissolve above about pH 6. Because the complexes of highly carboxymethyl substituted cellulose and an undenatured protein component as initially formed in aqueous solution are believed to be primarily mainly electrostatic and therefore sensitive to pH and ionic strength, methods for stabilizing the bond between the biopolymers, so that the complex was stable under various processing conditions utilized in manufacture or storage of various food products are important for the development and commercial utilization of the synthetic fibers. Fibers may be produced which are relatively bland, firm, white and chewy.

An important feature is that the fibers may be stabilized if the fibers are heated to an elevated temperature, such as by boiling in water (e.g., at or near the isoelectric point of the highly carboxymethyl substituted cellulose - protein complex) for a few minutes. It appears that the treatment denatures the protein or the complex as a whole so as to prevent the dissociation and/or dissolution of the highly carboxymethyl substituted cellulose.

Heat treatment of the protein-highly carboxymethyl substituted cellulose complex fibers not only results in stabilization of the fibers to retain their firmness, but may also be utilized to pasteurize the fibers. In addition, by varying the temperature and the time of heating, different degrees of firmness and stability of the fibers can be obtained, as desired.

The moisture content of the drain-dried fibers will generally be in the range of 75 to about 90 percent, such as about 80%, and it is desirable to add flavoring agents when the fibers, as precipitated, or after heat stabilization may be substantially reduced in moisture content to provide a low moisture fiber product (e.g., less than about 30 weight percent water) which retains its fiber integrity. These fibers may be rehydrated to obtain a texture that is similar to that of the drain-dried ones.

The moisture content of pressed fibers will generally be in the range of from about 60 to about 80 weight percent, such as about 65%. Fiber compositions having reduced moisture content, such as less than about 25 weight percent, may be provided which have longer shelf life and easier handling for shipping and storage. However, the fibers may become fragile and brittle at very low moisture content, for example, when lyophilized to contain less than about 4 weight percent moisture. As a result, a suitable amount of moisture content may be retained in order to maintain fiber firmness and structural integrity.

As indicated, the highly carboxymethyl substituted cellulose-protein fiber compositions in accordance with the present invention may be flavored to simulate the flavor of a selected natural meat composition, particularly after heat stabilization of the fiber complex.

The flavored fibers, or unflavored fibers, may be incorporated in the C-gel matrix, as a dispersed phase will be generally discussed in more detail hereinafter with specific reference to xanthan/protein complex fibers.

Edible lambda carrageenan/protein fibers are also desirable for utilization in C-gel composite products in accordance with the present invention. Such lambda carrageenan/protein complex fibers may be prepared from an aqueous fiber generating solution as described hereinabove.

The fiber generating solution includes a protein as previously described, and further includes a solubilized food grade lambda carrageenan. Carrageenans are structural polysaccharides of red sea plants such as Chondus crispus and Gigartina stellata. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan has a general linear structure having substantially three pendant sulfate groups for each two monosaccharide groups along the polymer backbone:

Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide groups along the backbone. Kappa carrageenan and iota carrageenan alone do not form fiber complexes from protein solutions. A discussion of the physical and chemical properties of lambda carrageenan may be found in Industrial Gums, R. L. Whistler, Ed., Academic Press, N.Y.

The lambda carrageenan component will desirably contain at least about 50 weight percent lambda carrageenan based on the total weight of iota, kappa and lambda carrageenan, and more preferably at least about 60 weight percent lambda carrageenan, based on the total weight of the carrageenan. The lactarin PS189 product of FMC, which contains about 50 percent lambda carrageenan, 20-30 percent Kappa carrageenan and 20-30 percent dextrose by weight, was been successfully utilized to provide fibrous complexes as described herein. The Viscarin GP109 product (50-60% lambda and 40-50% Kappa) and the RE9345/6 products of FMC (100% lambda) are also examples of lambda carrageenan products which may be used to prepare polysaccharide/ protein complex fibers for use as a dispersed fibrous phase of the C-gel composite products of the present invention.

In aqueous solution, the highly charged mutually repelling sulfate ester side chains, which are disposed along the polysaccharide backbone of lambda carrageenan, are believed to provide a relatively linear structure, which is further believed to be an important factor in the provision of fiber complexes in accordance with the present invention. A relatively high molecular weight is also believed to be an important factor in complex fiber formation.

The lambda carrageenan component may be used with highly substituted, highly molecular weight carboxymethyl cellulose components, xanthan gum or mixtures thereof, or with other anionic polysaccharide gums in amounts which do not prevent fiber formation. When used with other potential complex fiber-forming polysaccharides such as xanthan gum, and/or carboxymethyl cellulose, the relative proportions of these components may vary over a wide range. The carboxymethyl cellulose or other anionic polysaccharides may be of "border line" fiber forming capability, with the lambda carrageenan, xanthan gum and/or the highly substituted, high molecular weight carboxymethyl cellulose component contributing a strong fiber forming capacity. When used with other non-fiber forming polysaccharides such as iota and kappa carrageenan, carboxymethyl cellulose, pectins and alginates, which alone do not self-assemble under appropriate conditions with proteins to form fibers, the proportions of fiber-forming polysaccharide such as lambda carrageenan to the non fiber-forming polysaccharide should be sufficient to provide spontaneous fiber formation.

When the lambda carrageenan is dissolved with non fiber-forming anionic polysaccharides in the fiber-forming solution, the lambda carrageenan should desirably comprise at least about 50 weight percent of the anionic polysaccharide components, and more preferably at least about 75 percent.

The protein fiber generating solution may be provided in any suitable manner, as by preparing and subsequently combining separate protein component and lambda carrageenan, and by initially preparing a solution comprising both components. The protein component may be as previously described hereinabove. Further in accordance with the present disclosure, the fiber generating solution should contain a solubilized protein component and lambda carrageenan in a particular range, and in this regard, the total solubilized protein and lambda carrageenan components should be in the range of from about 0.1 weight percent to about 10 weight percent, preferably from about 2 to about 8 weight percent, and more preferably from about 4 to about 6 weight percent based on the total weight of the aqueous fiber generating solution.

The aqueous fiber forming solution may further include other components, including other dissolved or suspended protein components, flavoring agents, preservatives and hydrocolloids.

The complex forming solution may also include water solubilized, substantially nonionic edible polysaccharides such as dissolved starch, solubilized agar and agaroids, dissolved guar gum, dissolved carob gum, water soluble dextrans, water or alkali soluble edible grain bran and/or hemicellulose constituents such as solubilized wheat gum, solubilized wheat bran, solubilized oat bran and solubilized corn bran constituents, as well as mixtures of such nonionic polysaccharides, as described hereinabove.

The nonionic polysaccharide component will typically tend to increase the water content of the polysaccharide/protein complex. It is desirable that the complex contain at least about 15 weight percent of solids, and preferably for a variety of uses, at least about 20 weight percent solids, and the amount and type of nonionic polysaccharide may be adjusted to provide a desired solids level.

Starch and other nonionic polysaccharides such as agar may be included in amounts which do not prevent fiber formation, also as described hereinabove with respect to fiber forming carboxymethyl cellulose. Substantially fully hydrated starch is a particularly desirable nonionic polysaccharide component in view of its relatively bland taste, relatively low caloric content when hydrated, and its price-performance effectiveness. Starch may desirably be included in the complex forming solutions, and in the precipitated complexes, in amounts of from about 1% to about 75% by weight, based on the total weight of the polysaccharide/protein complex on a dry basis. For various uses, the starch will preferably be included in the precipitated complexes in an amount in the range of from about 25 percent to about 60 percent by weight, based on the total weight of the complex on a dry basis. Starch components may include amylose, amylopectin and mixtures thereof, as previously described. As previously noted, when using unrefined natural sources of neutral polysaccharides or proteins, or both, it may be desirable to separate undissolved solids from the complex forming solution prior to pH adjustment to achieve complex formation.

The amount of added neutral polysaccharide components for certain uses should best not exceed the total amount of the specified protein component and the lambda carrageenan component, and in any event, for purposes of producing meat-like fibers, such additional materials should not be included in amounts which significantly interfere with or prevent fiber formation.

To prepare fibers, the pH of the fiber generating solution is adjusted to a pH at which the components form a complex, which is preferably within about 2 pH units of an optimum isoelectric pH for the desired complex, to form a fibrous protein-polysaccharide complex under conditions of mixing of the fiber forming solution. In this manner, hybrid protein complexes may be formed which have a fibrous-meat like texture. The fiber formation may occur over a range of pH approaching the isoelectric point of the lambda carrageenan/protein complex. In this regard, for example, for a high molecular weight lambda carrageenan/egg white protein/sodium caseinate complex, fiber formation may begin at moderately high acidic pH values and increases as the pH is adjusted to or near to the isoelectric point of the complex, which typically may be in the range of from about 1 to about 5. The fiber formation is spontaneous and does not require the use of spinning equipment. Moreover, the fibrous network syneresses (exudes water), which is desirable in the minimization of energy intensive drying steps. The fibers under some processing conditions (e.g., when air is beaten into the fiber slurry) may be less dense than the aqueous phase and thus float to the surface for harvesting by skimming the surface of the reaction vessel or draining away the aqueous phase from below such fibers, as in a standard cheese vat. The separation of the fibrous lambda carrageenan/protein complexes from the liquid phase, removes salts and undesirable flavor components from the protein-complex, while at the same time concentrating the protein component. Once the fibers are formed, they are relatively stable to a range of salt and pH conditions about the isoelectric point of the complex, but have stability limitations and may readily be redissolved under appropriate conditions. The fibers are desirably further processed by heating to stabilize the complex, as will be described hereinafter.

The texture of the lambda carrageenan/protein complex fibers may be controlled by varying the ratio of the fiber forming polysaccharide component versus the protein component. The desired fiber forming polysaccharide (e.g., lambda carrageenan) to protein weight ratio is within the range between 1:2 and 1:15, and more preferably in the range of from about 1:4 to about 1:10. The precipitated fibers should best have a weight ratio of ionic polysaccharide (e.g., xanthan gum, carboxymethyl cellulose, lambda carrageenan or mixtures thereof) to protein in the range of 1:4 to 1:10.

The adjustment of pH to form fibers from the lambda carrageenan/protein mixture may be carried out in a variety of ways. In this regard, the protein fiber generating solution may be provided at a pH significantly above the isoelectric point of the protein complex fibers, and subsequently reduced in pH toward its isoelectric point. This pH reduction may be carried out for example by removal of a cationic counterion (e.g., Na+) of the solubilized lambda carrageenan or protein component as by electrophoresis, or by addition of an edible or food grade acid such as hydrochloric acid, phosphoric acid, acetic acid, citric acid, ascorbic acid, carbonic acid (carbon dioxide) or mixtures thereof. The acid appears to protonate both the carboxylate and the amino groups of the protein to make the protein less negatively charged so as to link the polymeric chains of the very negatively charged lambda carrageenan, to form an ionic polysaccharide protein complex that has a fibrous network. Adjustment of pH may also be carried out by other appropriate techniques such as by combining an aqueous solution of the protein component at a predetermined pH at which the protein component is solubilized with an aqueous solution of the lambda carrageenan component at a predetermined pH at which it is solubilized, such that upon combination the resulting solution has a predetermined pH at or near the isoelectric point of a desired lambda carrageenan/protein fibrous complex. In this regard, it will be appreciated that the protein component may be provided in aqueous solution in broad ranges of pH at higher and lower pH than its protein isoelectric point(s), and the lambda carrageenan, which has substantially only anionic sulfate groups may also be provided in aqueous solution over a broad range of pH. It will also be appreciated that the pH may be adjusted by selective anion removal from a combined solubilized protein and lambda carrageenan solution having low pH, in order to raise the pH to a value approximating the isoelectric point of a desired protein component-lambda carrageenan fibrous complex, or an edible food grade base, such as sodium hydroxide may be added to such solubilized acidic mixtures.

The fibrous complex reaction is completed or maximized when the lambda carrageenan/protein mixture is adjusted to a pH at which the electrophoretic mobility of a desired lambda carrageenan/protein mixture is substantially zero. Electrophoretic mobility may be measured using conventional analytical instruments such as a System 3000 electrokinetic analyzer manufactured by PenKem, Inc., Bedford Hills, N.Y.

Because the salt balance affects the electrical charge on the protein and lambda carrageenan, and because the electrical charge on these polymers affects their interaction with each other, the manipulation of molecular electrokinetic properties is important to the control of the texture of their complex interaction product. By adjusting the pH of the fiber generating solution containing two or more protein and lambda carrageenan polyelectrolytes of opposite principal polarity, so that the pH is below the isoelectric point of at least one of the polyelectrolytes, a reaction among the various polyelectrolytes may be carried out, particularly when the net charge of the electrolyte with high pI is positive and that of the other polyelectrolyte is negative. Although it is desirable that opposite net charges be achieved, it is not required. A desirable reaction will take place when the reacting species are like-charged but the charge is reduced to the extent that electrostatic repulsions are overcome in order to allow the reaction to take place.

The isoelectric points of the specified protein component and the lambda carrageenan component may have widely different values, for example, the isoelectric point of a soy protein isolate component may typically be about pH 4.4, while lambda carrageenan, because it may have substantially only pendant anionic sulfate ionic species, has a substantive electrical charge even at pH 2.5. Highly substituted carboxymethyl cellulose complexes with soy protein will have intermediate isoelectric points, depending upon the relative proportions of each in the complex. Optimal points for hybrid complex formation may be determined by measuring the isoelectric points of desired complexes, which may be carried out by measuring the isoelectric point values separately for the reactants, and adjusting the mixture pH to a value intermediate to the individual pI to form a sample of the desired complex. The pI of the complex thus formed may be measured to determine a desired pH for the complex formation as the control point of the reaction to maximize product yields and achieve the desired fibrous food texture. It will be appreciated, as will be further discussed, that the isoelectric point of a protein/lambda carrageenan complex may vary depending upon the respective proportions of the components of the complex.

The shape and size of the polysaccharide/protein complex fibers may be controlled by the degree of shear or mixing applied to the fiber forming solution during pH adjustment. For example, long, large and nonordered fibers may be prepared under conditions of relatively low shear mixing, while short, fine and uniform fibers may be obtained under conditions of relatively high shear mixing during adjustment of the solution pH to the desired fiber-forming value.

After formation of the lambda carrageenan protein complex fibers, it is important to heat the fibers to stabilize them in fiber form so that they are capable of withstanding a broad range of pH, mechanical shear and ionic conditions, as well as stability in interaction with a broad range of other food components. Such stabilization may be carried out by heating the fibers to a temperature of at least about 70° C. for at least 30 seconds, and more preferably at least about 95° C. for at least about 5 seconds to denature the protein within the complex at least about 40 percent and more preferably at least about 90 percent, and stabilize the complex. Desirably the fibers will be heated to a temperature of about 100° C. as by boiling in water or steam injection, for at least about 5 seconds to substantially fully denature the protein component of the complex. The heat dependency of denaturation will typically vary with pH, with the complex being easier to denature at lower pH values. By "denatured" is meant that the protein has lost its native secondary and tertiary structure, such as measured by differential scanning calorimetry ("DSC"). Denaturation may result in substantial disulfide crosslinking, such as measured by gel electrophoresis, which will also help stabilize the complex. The fibers of ionic polysaccharide/ protein complexes such as xanthan/protein complexes, carboxymethyl cellulose/protein complexes and lambda carrageenan complexes may also be stabilized by heat treatment in the preparation of the C-gel matrix at elevated temperature.

Several proteins may be utilized with lambda carrageenan to form multiple protein/lambda carrageenan complexes. For example, fibrous ternary complexes of soy/lambda carrageenan/whey protein isolate may be provided in which the ratio of the protein components is varied to provide desired fibrous products having a corresponding variety of characteristics. As also indicated, the complexes may comprise a lambda carrageenan mixture with other ionic polysaccharides, such as xanthan gum, and non fiber forming carboxymethyl cellulose compositions. Such lambda carrageenan/polysaccharide blends may be selected not only for reasons of economy, but also to vary the texture of the fibers.

Utilization of various protein components and component blends permits manufacture of synthetic meatlike protein fibers which differ in color, firmness and flavor depending on components and processing variations. The fiber complexes of vegetable proteins such as soy isolate, with whey protein, are functionally nutritious and may substantially completely suppress undesirable vegetable protein flavor components.

Upon formation, the complexed lambda carrageenan-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 60 to about 80 weight percent moisture, and typically about 65 percent by weight moisture. The press dried fibers may be flavored by immersing them in a suitable favoring agent such as pork, lobster, crab, chicken or beef extract to obtain desired, chewable meat-like products having meat simulating flavor and texture.

At acidic pH, the basic groups of the protein, namely the lysine, arginine and histidine residues are protonated and positively charged. In contrast, the lambda carrageenan is still negatively charged at the reaction or interaction pH. As a result, the lambda carrageenan and the protein interact spontaneously by electrostatic attraction which is controlled by the pH, the ionic strength, the isoelectric point of the protein and the pKa of the lambda carrageenan.

The undenatured fibers of lambda carrageenan/ protein complex will soften or redissolve above about pH 6. Because the complexes of lambda carrageenan and an undenatured protein component as initially formed in aqueous solution are believed to be primarily mainly electrostatic and therefore sensitive to pH and ionic strength, methods for stabilizing the bond between the biopolymers, so that the complex was stable under various processing conditions utilized in manufacture or storage of various food products are important for the development and commercial utilization of the synthetic fibers. Fibers prepared in accordance with the present disclosure may be produced which are relatively bland, firm, white and chewy.

As indicated, the fibers may be stabilized if the fibers are heated to an elevated temperature, such as by boiling in water (e.g., at or near the isoelectric point of the lambda carrageenan - protein complex) for a few minutes. It appears that the treatment denatures the protein or the complex as a whole so as to prevent the dissociation and/or dissolution of the lambda carrageenan.

Heat treatment of the protein-highly lambda carrageenan complex fibers not only results in stabilization of the fibers to retain their firmness, but may also be utilized to pasteurize the fibers. In addition, by varying the temperature and the time of heating, different degrees of firmness and stability of the fibers can be obtained, as desired. Such heat treatment may be carried out as a part of C-gel composite product manufacture and/or high temperature packaging steps.

The moisture content of the drain-dried fibers will generally be in the range of 75 to about 90 percent, such as about 80%, and it is desirable to add flavoring agents when the fibers, as precipitated, or after heat stabilization may be substantially reduced in moisture content to provide a low moisture fiber product (e.g., less than about 30 weight percent water) which retains its fiber integrity. These fibers may be rehydrated to obtain a texture that is similar to that of the drain-dried ones.

The moisture content of pressed fibers will generally be in the range of from about 60 to about 80 weight percent, such as about 65%. Fiber compositions having reduced moisture content, such as less than about 25 weight percent, may be provided which have longer shelf life and easier handling for shipping and storage. However, the fibers may become fragile and brittle at very low moisture content, for example, when lyophilized to contain less than about 4 weight percent moisture. As a result, a suitable amount of moisture content may be retained in order to maintain fiber firmness and structural integrity.

As indicated, the lambda carrageenan/protein fibers may be flavored to simulate the flavor of a selected natural meat composition, particularly after heat stabilization of the fiber complex.

The protein or polysaccharide/protein complex component will desirably be in dispersed fiber form, with the fibers having a length of less than about two centimeters, and preferably less than one centimeter for specific products. Meat components may desirably be prepared by grinding, chopping and emulsifying the meat component ingredients to provide a substantially homogenous meat emulsion component which is dispersed in the C-Gel matrix. Meat and meat products, as well as the polysaccharide/protein complex products, may also be incorporated in the C-Gel matrix in the form of shreds, dices and other particulate forms. The dispersed meat or seafood protein component may be undenatured, partially denatured, or denatured by cooking, depending upon the desired properties of the composite C-Gel products to be prepared therewith.

Desirably, the meat, other protein and/or polysaccharide/protein complex fiber component should be present in an amount of from about 5 to about 80 percent by weight, based on the weight of the total C-Gel composite product. The meat, other protein fiber components will typically comprise from about 10 percent to about 30 percent protein and from about 25 to about 80 percent water, by weight, based on the weight of the meat or other protein composition. The composition of the polysaccharide/protein complex fiber components may be varied as describved hereinabove. However, dried meat or other protein components (e.g., fried bacon bits) having less than 25 weight percent water and proportionately higher protein levels may also be dispersed in the C-Gel matrix. Such dried protein components, however, will tend to at least partially rehydrate in contact with the continuous C-Gel matrix phase.

Flavored polysaccharide/protein complex fibers such as protein complexes with xanthan, carboxymethyl cellulose and/or lambda carrageenan as previously described may be combined with a binding agent such as a starch gelling agent or undenatured egg white and pressed into the desired form or shape. The flavored and consolidated form may be heat-set by raising the temperature of the blended fiber and binder mixture to or near the boiling temperature of water. Such heating may be accomplished in any suitable manner, such as by means of conventional hot air, radiation, conduction or microwave ovens, or deep-frying. The heating temperature and time can be varied depending on the physiochemical properties of the fibers as well as the desired texture and appearance of the form stable product desired. Such products may be diced or shredded and incorporated in the C-gel matrix as a dispersed food product phase.

Composite C-Gel compositions which contain a homogeneous or dispersed fruit phase are also particularly preferred. In this regard, fruits such as apples, peaches, pears, bananas, grapes, citrus fruits such as oranges, lemons and grapefruit, and berries such as raspberries, strawberries, blueberries, may be incorporated as a dispersed phase in a C-Gel matrix in accordance with the present invention, to provide novel and delicious food products. Vegetable components such as tomatoes, peppers and the like are also particularly desirable dispersed phases, which may be incorporated in high weight percentage, if desired, in the manufacture of C-Gel sauces and flavorings.

As indicated, the composite C-Gel matrix compositions may desirably further comprise a dispersed fat phase. Such dispersed fat phase, when present, may typically be present at a level of at least about 2%, and usually in the range of from about 5 to about 30 weight percent, based on the total weight of C-Gel composite food products. Fat derived from milk, meat and seafood components, as well as vegetable fats such as soybean, coconut, palm kernel, sunflower, canola (rapeseed), peanut, corn, safflower, and cottonseed oils, as well as manufactured polyol polyesters, may desirably be used as the fat component. The fat component may be unhydrogenated, fully hydrogenated, partially hydrogenated or transesterified, depending upon the desired characteristic for the intended product. The melting point of the fat is not critical and can be varied depending upon the properties of the product desired. When utilized, the fat component is desirably uniformly dispersed throughout the gelatin-carrageenan continuous phase matrix. Generally such dispersion is carried out and maintained at least in part through the utilization of a suitable emulsification agent and appropriate processing steps, as will be more fully explained hereinafter.

As indicated, the C-Gel composite food products, particularly those which contain a dispersed fat component, may further comprise an emulsifying agent. Suitable emulsification agents include conventional emulsifiers such as mono and diglycerides, phospholipids, polysorbates, sorbitan esters and polyoxyl esters. Buttermilk powder, which includes a substantial phospholipid content (e.g., about 0.2 weight percent), is particularly preferred as an emulsifying agent in the preparation of C-Gel composite food products in which the delicate dairy flavor of buttermilk is desired. Even emulsification agents such as non-fat dry milk, whey (protein), casein or caseinates may also be used in certain compositions for emulsification effects.

Generally, emulsification agents will be present at an effective amount in the composition to achieve dispersion of the fat phase, which amount may typically be in the range of from about 0.2 to about 12 weight percent, based on the total weight of the composition, and dependent upon the types of emulsification agents used and the type of product being produced.

As indicated, the composite C-Gel matrix composition comprises a firm, aqueous carrageenan-gelatin continuous phase matrix, and in this regard, an appropriate amount of water is also an important component of the C-Gel composite food products of the present invention. Water may generally be present in the composite food products at a level of at least about 30 weight percent, and preferably in the range of from about 40 to about 70 weight percent, based on the total weight of the C-Gel composite food product. Typically, the water content will be in the range of from about 50 to about 70 weight percent of its total C-Gel composite food product. The water content of the carrageenan-gelatin continuous phase of the composite compositions may be different from the water content of the dispersed components, but will generally also be present at a level of at least about 50 percent, and preferably in the range of from 50 to about 95 weight percent, based on the total weight of the C-Gel continuous phase component of the food products.

A food grade acid component may be used in the C-Gel composite food products of the present invention to provide a product with a pH value in the range of from about 4.0 to about 6.0 and preferably from about 4.4 to about 5.7. Although maximum firmness of the kappa carrageenan - gelatin continuous phase aqueous matrix is provided at a pH of less than 5.0, the level of acidity may be adjusted to provide optimum flavor, and/or shelf life properties. Suitable food grade acids include adipic acid, citric acid, lactic acid, acetic acid, phosphoric acid and the like. It will be appreciated that acidic components may be incorporated into or may be inherent in ingredient components, or may be added as a separate component during manufacture of the food product to provide adjustment of the pH to the desired value.

Particularly preferred protein fiber or polysaccharide/protein complex fiber containing C-Gel products may desirably employ a cheese-flavored C-Gel matrix. In this regard, such products may include up to about 50 weight percent of a fermented dairy derived flavoring agent, based on the total weight of the C-Gel composite food product, such as a flavored cheese product or cheese product having an intensified American cheese flavor, as described in U.S. Pat. No. 4,172,900. When using such a highly intensified cheese product component, the component will desirably be present in an amount of from about 1% to about 8% based on the total weight of the C-Gel composite product. Cheese products in which a proteolytic micrococcus, a self-limiting lipase and a flavor culture are utilized in the make procedure are also particularly desirable. The casein and other protein components of such flavoring agents may be substantially hydrolyzed.

Generally in accordance with the present invention, methods are also provided for manufacture of C-Gel composite food products comprising the steps of providing from about 1 to about 12 parts by weight of a gelatin having a water content of less than about 11% and a bloom strength of at least about 125 in finely divided form having a particle size of less than about 40 mesh, providing at least about 0.5 parts by weight of kappa carrageenan having a water content of less than about 12% in finely divided form having a particle size of less than about 60 mesh such that the carrageenan and gelatin have a carrageenan-gelatin weight ratio in the range of from about 1:6 to about 3:1, dry basis, providing from about 2 to about 30 parts by weight of a blending component selected from the group consisting of an edible fat, a dry, powdered carbohydrate, and mixtures thereof, and blending the gelatin and carrageenan with the blending component. When using an edible fat blending component, the blending should best be carried out at a temperature at or above the melting point or melting range of the fat component. The carrageenan and gelatin are blended with the blending component to provide a homogeneous mixture in which the carrageenan and gelatin are dispersed in the blending component. Emulsifiers and other non-aqueous optional ingredients such as flavorings, antimycotics, stabilizers and coloring may desirably be blended with the carrageenan and gelatin together with the blending component. The homogeneously blended mixture may subsequently be combined with the dispersed food component together with enough water to provide from about 30 to about 80 parts by weight of water in the final product, and salts such as sodium chloride and sodium citrate, if desired, to form a pre-mix. Alternatively, it may be desirable to delete a portion or all of the water or the dispersed food component and add these ingredients directly at the cooker. The pre-mix and any ingredients added at the cooker are mixed and heated to at least about 70° C. with an optional emulsifying salt and then are cooled to a temperature of less than about 10° C. to provide a structurally firm continuous phase aqueous carrageenan-gelatin matrix having a dispersed food product homogeneously distributed therein. The optional emulsifying salt may be incorporated in the pre-mix, preferably as the last ingredient used. If a food grade acid is used it may be dissolved in the pre-mix water or it may be added to the other ingredients prior to, during or after the heating process. When an animal or vegetable fat is not used, the carrageenan and gelatin may be gradually blended into a moist food component at about 5° to 25° C. in such a manner so as to prevent lumping of the carrageenan and gelatin due to too rapid hydration.

A further advantage of the gelatin-carrageenan matrix is that it melts when sufficient heat is applied, which does not occur with many other hydrocolloid, protein or hydrocolloid-protein food systems. In accordance with the present invention, C-Gel composite food products may be readily provided which are firm at refrigeration temperature (i.e., 45° F.) and which may exhibit desirable melt characteristics at elevated temperatures.

Specific embodiments of the present invention are also directed to methods for manufacturing individually wrapped slices ("IW hot pack") at elevated temperatures. The individually wrapped C-Gel composite slices may desirably have extended refrigerator shelf life provided by pasteurization within such individual packages. The term "slice" is used broadly herein to include products in sheet form, however manufactured. The slice products in accordance with such methods may be prepared directly in sheet form, and are not physically cut into sheet from from a larger form.

In accordance with method aspects of the present invention, methods for manufacturing individually wrapped, single slice, firm bodied C-Gel composite food products are provided comprising the steps of preparing a viscous, fluid C-Gel food composite as previously described, at an elevated temperature of at least about 155° F. and preferably at least 160° F., forming a packaging film tube, and introducing the C-Gel composite fluid into the packaging film tube at an elevated temperature. The tube may be longitudinally sealed (e.g., fin or overlap seal), or may be overlapped without sealing, depending upon the desired package configuration. Full hydration and dispersion of carrageenan may occur at temperatures in excess of 165° F. (e.g., 170° F.–180° F. or more) to fully pasteurize the product (and complete heat setting polysaccharide/protein fibers if desired) while maintaining the composite properties of the product. Further in accordance with the invention, the C-Gel composite is displaced from a cross sealing zone and the packaging film tube is transversely cross sealed to provide a sealed package. The C-Gel composite fluid may be cooled in the film tube prior to displacing the C-Gel composite and cross sealing the tube. In order to provide extended shelf life, C-Gel composite products which are sensitive to spoilage may be packaged in substantially gas impermeable wrappers. By substantially gas impermeable is meant that the packaging film is substantially free of pinholes and has a moisture vapor transmission rate (MVTR) of less than 0.9 grams of moisture per 100 square inches of the packaging film at atmospheric pressure at 100 F. and 90% relative humidity per 24 hours, and preferably less than about 0.4 grams/100 in$^2$/24 hours. A plurality of the individually wrapped slices may be stacked together and overwrapped with a substantially gas impermeable packaging film to provide a consumer package having excellent storage stability and convenience.

As indicated, in accordance with certain aspects of methods of the present invention, a viscous, C-Gel composite mixture may be prepared for further use in manufacture of novel food products. The blend may be "heat-settable" or thermoreversible. It is a particular advantage of certain embodiments, that the blend be thermoreversible, to provide for product manufacture and to produce a sliced product which may readily be melted if desired by the consumer. However, blends may also be prepared which are heat settable. By "heat-settable" is meant that the C-Gel composite blend is initially a viscous, flowable form, and is transformed into a form stable condition, for example by heating a composite C-Gel blend containing an emulsified natural meat component to a protein denaturation temperature. Heat settable C-Gel blends may be particularly desirable for certain types of C-Gel meat products where product melting at elevated temperatures is not desired. When producing wrapped slices as previously described, it is desirable for C-Gel compositions including substantial portions of vegetable, fruit or polysaccharide/protein complex fibers and/or natural meat components, that the fiber size be limited, and that the composite mixture have stability and flow characteristics which facilitate cross sealing of the packaging film tube without substantial retention of fibers or other composite C-Gel components in the cross seal zone. The C-Gel composite fluid composition used in IW hot pack processes in accordance with the present invention is effectively non-syneresing, because the components are substantially fully retained in the finished product slices. By "non-syneresing" is meant that free water is not substantially expressed from the product.

A non-syneresing, C-Gel composite mixture may be provided by appropriate component selection such that the water content of the product is retained in the form stabilized slice products during cooling and product storage. The continuous C-Gel phase provides a high degree of syneresis control. In addition, a heat-activatable starch product may be included in the composite mixture which does not substantially absorb water below its heat activation range, but which gels and absorbs water at or above such temperature range. The amount of heat-activatable starch utilized may be selected based on the C-Gel composite blend, and in this regard, may desirably be in the range of from about 0.5 to about 8 percent by weight based on the total weight of composite blend.

A longitudinally sealed packaging film tube is preferably formed for C-Gel products where maximum protection is desired. By "longitudinally sealed" is meant that the film tube is continuously sealed about a cross section through its longitudinal axis.

The heated, C-Gel composite fluid is introduced into the film tube, which is longitudinally sealed, or overlapped. The film tube may be substantially sterile, and by placing the C-Gel composite fluid in contact with the film while hot (e.g., at least at pasteurization temperature), a substantially microorganism free film-slice interface may be provided. In this regard, the heated composite fluid may be placed on the film before the film tube is longitudinally sealed, but is preferably extruded through a discharge nozzle adjacent or internally of a zone of continuous film tube formation, to form a continuous, longitudinally sealed packaging film having the C-Gel fluid enclosed therein. The tube and enclosed composite C-Gel fluid will be formed as a continuous sheet or ribbon having a width generally corresponding to the width of the C-Gel composite single slice product to be produced. The film tube may typically have a width in the range of from about 2 to about 5 inches and a thickness in the range of from about 1/16th inch to about 3/16ths inch.

The C-Gel composite fluid is displaced from a cross sealing zone and the packaging film tube is transversely sealed at the cross sealing zone to provide a sealed package. The sealed package and the heated C-Gel composite fluid contained therein are subsequently cooled to provide firm-bodied C-Gel composite food product slices. The film tube containing the C-Gel composite fluid may, if desired, be at least partially pre-cooled before cross sealing.

It is particularly desirable in accordance with the present invention, that the C-Gel composite fluid be heated to pasteurization temperature and introduced under sterile or aseptic conditions within the substantially hermetically sealed, individually wrapped single slice package. Accordingly, wrapped slices may be prepared which are not exposed to the atmosphere until the wrapping is removed by the consumer.

Figure 7:
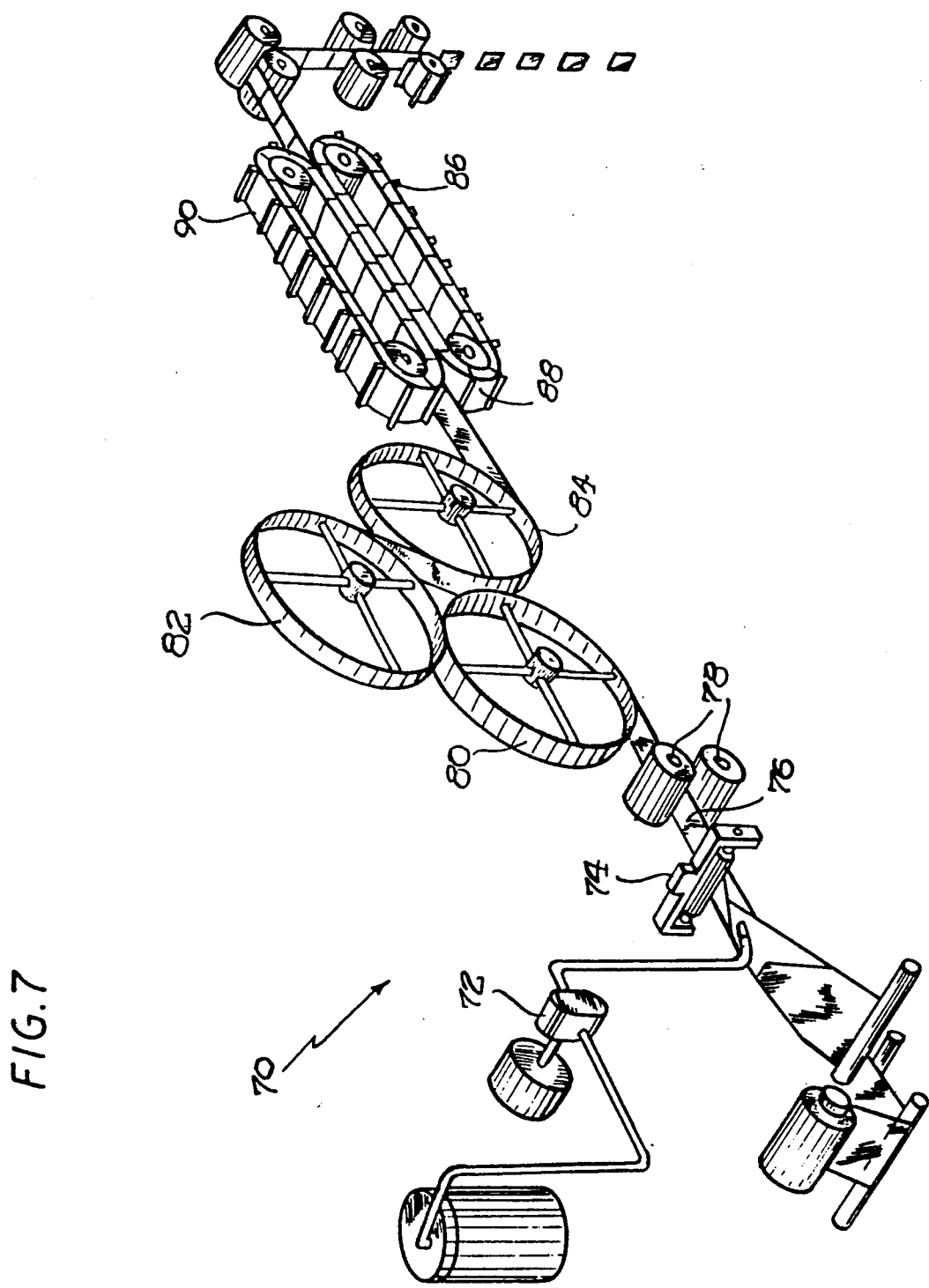
FIG. 7 is a schematic illustration of a hot packaging apparatus for producing individually wrapped slices of C-Gel products in accordance with various embodiments of the present invention.

Individually wrapped slice, hot-pack packaging apparatus 70 for carrying out such packaging is illustrated in FIG. 7. The C-Gel food product to be packaged is heated to a pasteurization temperature, which pasteurizes the product and provides it in a fluid condition for packaging. The heated product, which may desirably be vacuum deaerated, is pumped from storage by positive metering pump 72 at a precisely controlled rate to an extruding nozzle at film forming station 74, which comprises a packaging film dispensing apparatus for a continuous roll of heat sealable wrapping material. The wrapping material is continuously formed into a wrapping material tube 76 of substantially constant diameter, into which the fluid, heated C-Gel composite food product is discharged by the extrusion nozzle, which is positioned within the tube. Sizing rolls 78 may be provided to flatten the tube 76 and enclosed C-Gel composite food product composition to a desired product thickness, which may generally be in the range of from about 1/16 to about 3/16 inch for the illustrated apparatus 70. The flattened tube 76 passes around several thermal conditioning wheels 80, 82, 84 where the C-Gel composition within the film tube and its contents are cooled, and then is transported to a voiding and sealing station 86 comprising two opposing arrays 88, 90 of voiding and sealing elements, respectively, of the type described in U.S. Pat. No. 4,586,317 which is incorporated herein by reference. In the sealing station, the packaging film (which has an inner, heat sealing layer) is transversely sealed at spaced apart intervals corresponding to the spacing intervals of the voiding and sealing elements of the station 88. For high-speed operation, the cross sealed film tube may be subsequently further cooled, if desired, by thermal conditioning wheels like wheels 80, 82, 84, and may be subsequently cut apart at the cross seal midline to produce slices of C-Gel composite food products which are sealed for freshness and keeping quality within individual packages. It will be appreciated that the pasteurized C-Gel pre-mix may be aseptically packaged in this manner for exceptional keeping quality of the slices.

Having generally described various aspects of the present invention, the invention will now be more particularly described with respect to specific C-Gel composite food products described by the following examples.

EXAMPLE 1

A C-Gel matrix composition including a small amount of a dispersed fat phase was prepared having the following composition:

| Ingredients | C-Gel Matrix Weight Percent | Grams |
|---|---|---|
| Kappa Carrageenan | 3.75 | 90.0 |
| Partially hydrogenated soybean oil (margarine -type fat) (liquid at 100° F.) | 5.00 | 120.0 |
| Gelatin (250 Bloom) | 7.50 | 180.0 |
| Water | 73.25 | 1,758.0 |
| Lemon Juice | 2.50 | 60.0 |
| Steam Condensate | 8.00 | 192.0 |
| | 100.00 | 2,400.0 |

In preparing the matrix composition, a C-Gel matrix pre-mix was prepared by first mixing the kappa carrageenan and the margarine fat components, then blending in the gelatin and finally mixing in the water and lemon juice components. The fat was included in the C-Gel matrix composition and pre-blended with the carrageenan to prevent the kappa carrageenan and gelatin from lumping when the water-lemon juice components were added. The blended components were cooked to a final temperature by 180° F. by direct steam injection into the blend. After cooking and final stirring, samples were taken for viscosity measurements at 80° C. (176° F.). The remainder was poured into a 5 pound loaf and placed in a 42° F. cooler. After several days in the cooler, Texture Profile Analysis (TPA) was conducted at 45° F. and 72° F.

A beef analog C-Gel protein fiber composite food product was similarly prepared utilizing a C-Gel matrix like that described hereinabove, together with synthetic xanthan-protein fibers and flavoring components to produce a beef analog C-Gel composite food product as follows:

| Ingredients | Weight Percent | Grams |
|---|---|---|
| Partially hydrogenated soybean oil (margarine-type fat) (liquid at 100° F.) | 4.00 | 96.0 |
| Kappa Carrageenan | 1.50 | 36.0 |
| Gelatin (250 bloom) | 3.00 | 72.0 |
| Non-Fat Dry Milk | 6.00 | 144.0 |
| Sorbic Acid | 0.25 | 6.0 |
| 4 Amino Acid Mixture | 0.20 | 4.8 |
| Vegetable Salt Flavoring | 0.50 | 12.0 |
| Stirred Curd Cheese | 25.00 | 600.0 |
| Beef Flavor | 5.00 | 120.0 |
| Water | 24.50 | 588.0 |
| Lemon Juice | 0.75 | 18.0 |
| Lactic Acid (85%) | 0.30 | 7.2 |
| Sodium Citrate | 1.00 | 24.0 |
| Synthetic Protein Fibers (28% solids) | 20.00 | 480.0 |
| Steam Condensate | 8.00 | 192.0 |
| | 100.00 | 2,400.0 |

The synthetic polysaccharide/protein complex fibers were prepared from Xanthan gum, egg albumen, and whey protein in a 1:4:4 nominal weight ratio, as described in U.S. Pat. Nos. 4,563,360 and 4,559,233. A relatively high degree of agitation was used to produce relatively short fibers (approximately 1 cm.). A pre-mix was prepared by blending the above ingredients in the descending order shown, through and including the sodium citrate. The pre-mix was steam heated to 180° F. by direct steam injection. The protein fibers were gradually added to the blend at a temperature range of 130° F.-150° F. After heating to 180° F., samples were taken of the composite product for viscosity measurements at 80° C. The remainder of the batch was poured into a 5-pound loaf and placed in a 42° F. cooler. After several days in the cooler, Texture Profile Analysis (TPA) was conducted on the C-Gel Composite Product at 45° F. and 72° F. The product had an excellent flavor and a desirable texture. Products may similarly be prepared using lambda carrageenan and/or carboxymethyl cellulose as previously described in full or partial substitution for the xanthan gum, to produce the fibrous component.

As indicated viscosities were measured immediately following the preparation of the materials using the Haake Rotovisco RV12, a concentric cylinder viscometer, fitted with the MVI rotor for the C-Gel matrix sample and with the MVIII rotor for the beef flavored meat analog sample.

Viscosity data were obtained, in poise, at 80° C. (176° F.) on the C-Gel matrix from shear rates of 2.37 s$^{-1}$ to 75.8 s$^{-1}$. At shear rates above 75.8 s$^{-1}$ the viscosity test data became unreliable due to the Weissenberg ("rod-climbing") effect which is frequently observed in liquids that are highly elastic. Two viscosity measurement runs were performed. Viscosity data at the measured shear rates are tabulated in the following table:

| C-Gel Matrix Viscosity at 80° C. | | |
|---|---|---|
| Log Shear Rate | Run #1 Log Viscosity | Run #2 Log Viscosity |
| 0.376 | 1.242 | 1.325 |
| 0.677 | 1.175 | 1.240 |
| 0.978 | 1.117 | 1.164 |
| 1.279 | 1.062 | 1.110 |
| 1.580 | 1.018 | 1.052 |
| 1.881 | 0.948 | 0.975 |

In a similar manner, viscosity data, in poise, were obtained at 80° C. (176° F.) on the beef flavored meat analog sample. It was necessary to make the measurements at lower shear rates (0.08 s$^{-1}$ to 4.94 s$^{-1}$) due to limitations of the Haake RV12. Two runs were also made on this sample. The viscosity data for the fiber-containing product are tabulated in the following table.

| C-Gel Composite Viscosity at 80° C. | | |
|---|---|---|
| Log Shear Rate | Run #1 Log Viscosity | Run #2 Log Viscosity |
| −1.112 | 3.913 | 4.387 |
| −0.811 | 3.724 | 4.174 |
| −0.510 | 3.529 | 3.953 |
| −0.209 | 3.330 | 3.746 |
| 0.092 | 3.122 | 3.495 |
| 0.393 | 2.888 | |
| 0.694 | 2.666 | |

The Run #1 data is believed to be more reliable for both samples, due respectively to moisture loss or to the onset of gelation in the sample.

Texture Profile Analysis (TPA) measurements were performed on the samples after they had been cooled and stored for several days at 42° F. to evaluate the texture of the C-Gel matrix and C-Gel composite samples. In the TPA testing, a cylindrical plug is placed between parallel platens and force is recorded as it is subjected to two successive compression cycles to 80% of the original height of the plug. Eight parameters are obtained from the resultant force-compression curves: force at point of fracture (FAPOF), strain at point of fracture (POF), fracturability (FRAC), hardness (HARD), springiness (SPR), cohesiveness (COHEV), gumminess (GUM) and chewiness (CHEW).

The Instron testing apparatus was generally utilized in accordance with the procedure described by Bourne in "Texture Profile Analysis", Food Technology, July, 1978, p. 62, et. seq. In the testing, the cylindrical samples of the C-Gel matrix and the C-Gel composite food product which were 21 mm in diameter and 25 mm in height, were twice compressed at a constant (upper platen) velocity of 100 mm/minute by an Instron Universal Testing Machine, Model 1122 (manufactured by the Instron Corporation, Canton, Mass.) to a thickness of 5 mm. Measurements of the force in kilograms versus the deformation distance for the first compression cycle are charted as shown in FIGS. 1–4, which are graphic representations of the force versus compression distance data for the C-Gel matrix and beef analog product samples at the two-test temperatures of 72° F. and 45° F., respectively, as shown. The maxima in the curves are the fracture points of the samples. When a sample has been compressed to 1/5 of its original height, the deformation is stopped, the force removed and then reapplied. The force is mathematically normalized to the expanding (with compression) area of the cheese cylinder by assuming a cylindrical shape for the compressed cheese cylinder (which during the actual run may have a truncated cone shape, rather than a cylindrical shape) to determine a normalized force per unit area or stress value. At the higher temperature (72° F.), the products are softer. The composite beef analog C-Gel product with dispersed synthetic protein fibers was softer than the C-Gel matrix products, it is believed because of interaction of the fibers with the structure of the gel matrix. The measured and calculated texture profile values of Fracturability, Hardness, Springiness, Cohesiveness, Gumminess and Chewiness are set forth in the following tables.

| C-Gel Matrix at 72° F. | | | | |
|---|---|---|---|---|
| | FAPOF (KG/CMCM) | POF (% DEF) | FRAC (KG) | HARD (KG) |
| | 2.71 | 51.7 | 19.6 | 12.9 |
| | 2.22 | 51.3 | 16.0 | 10.5 |
| | 2.54 | 51.4 | 18.3 | 14.4 |
| | 2.53 | 52.0 | 18.4 | 10.9 |
| MEAN | 2.50 | 51.6 | 18.1 | 12.2 |
| SD | 0.20 | 0.3 | 1.5 | 1.8 |
| % SD | 8.16 | 0.6 | 8.4 | 15.0 |
| | SPR (MM) | COHEV | GUM (KG) | CHEW |
| | 4.00 | 0.046 | 0.6 | 663. |
| | 3.84 | 0.047 | 0.5 | 568. |
| | 3.90 | 0.050 | 0.7 | 650. |
| | 4.06 | 0.045 | 0.5 | 588. |
| MEAN | 3.95 | 0.047 | 0.6 | 617. |
| SD | 0.10 | 0.002 | 0.1 | 46. |
| % SD | 2.50 | 4.596 | 18.4 | 7. |

| C-Gel Matrix at 45° F. | | | |
|---|---|---|---|
| POF (DEF) | FAPOF FRAC (KG) | HARD (KG) | (KG/ CMCM) (%) |
| | 4.29 | 57.0 | 35.8  13.9 |

|  | -continued | | | |
|---|---|---|---|---|
|  | 4.14 | 56.1 | 33.8 | 23.1 |
|  | 4.57 | 60.6 | 42.2 | 31.6 |
| MEAN | 4.33 | 57.9 | 37.3 | 22.9 |
| SD | 0.22 | 2.4 | 4.4 | 8.8 |
| % SD | 5.04 | 4.2 | 11.8 | 38.6 |
|  | SPR (MM) | COHEV | GUM (KG) | CHEW |
|  | 4.10 | 0.032 | 0.4 | 1119. |
|  | 4.48 | 0.054 | 1.3 | 1128. |
|  | 4.93 | 0.052 | 1.6 | 1359. |
| MEAN | 4.50 | 0.046 | 1.1 | 1202. |
| SD | 0.42 | 0.012 | 0.6 | 136. |
| % SD | 9.23 | 26.447 | 55.0 | 11. |

| C-Gel Beef Analog Composite at 72° F. | | | | |
|---|---|---|---|---|
|  | FAPOF (KG/CMCM) | POF (% DEF) | FRAC (KG) | HARD (KG) |
|  | 0.34 | 38.2 | 2.0 | 7.2 |
|  | 0.30 | 32.2 | 1.5 | 6.8 |
|  | 0.53 | 35.8 | 3.2 | 9.3 |
|  | 0.43 | 28.0 | 2.4 | 7.6 |
| MEAN | 0.40 | 33.6 | 2.3 | 7.7 |
| SD | 0.10 | 4.4 | 0.7 | 1.1 |
| % SD | 25.58 | 13.2 | 30.1 | 14.3 |
|  | SPR (MM) | COHEV | GUM (KG) | CHEW |
|  | 2.78 | 0.089 | 0.6 | 178. |
|  | 3.14 | 0.096 | 0.7 | 174. |
|  | 3.74 | 0.092 | 0.9 | 253. |
|  | 3.58 | 0.081 | 0.6 | 214. |
| MEAN | 3.31 | 0.090 | 0.7 | 205. |
| SD | 0.43 | 0.006 | 0.1 | 37. |
| % SD | 13.14 | 7.096 | 16.1 | 18. |

| C-Gel Beef Analog Composite at 45° F. | | | | |
|---|---|---|---|---|
|  | FAPOF (KG/CMCM) | POF (% DEF) | FRAC (KG) | HARD (KG) |
|  | 0.94 | 37.9 | 5.5 | 14.2 |
|  | 0.95 | 41.3 | 6.0 | 11.8 |
|  | 1.09 | 46.4 | 7.4 | 15.4 |
|  | 0.97 | 41.7 | 6.1 | 13.4 |
| MEAN | 0.99 | 41.8 | 6.2 | 13.7 |
| SD | 0.07 | 3.5 | 0.8 | 1.5 |
| % SD | 7.03 | 8.4 | 12.9 | 10.9 |
|  | SPR (MM) | COHEV | GUM (KG) | CHEW |
|  | 3.78 | 0.091 | 1.3 | 431. |
|  | 3.87 | 0.084 | 1.0 | 407. |
|  | 4.13 | 0.096 | 1.5 | 465. |
|  | 3.87 | 0.086 | 1.2 | 420. |
| MEAN | 3.91 | 0.089 | 1.2 | 431. |
| SD | 0.15 | 0.005 | 0.2 | 25. |
| % SD | 3.86 | 6.025 | 16.8 | 6. |

As set forth in the previously referred to paper, the Fracturability of a sample is defined as the force at the first significant break in the force-compression distance curve. The Hardness of a sample is defined as the peak force during the first compression cycle, and the Cohesiveness is defined as the ratio of the positive force area under the curve during the second compression to that during the first compression. The Springiness is defined as the height that the sample recovers during the time that elapses between the end of the first compression cycle and the start of the second cycle. The Gumminess is defined as the product of Hardness and Cohesiveness, while the Chewiness is defined as the sum of the positive force areas under the curve during the first and second compressions. The Point of Fracture (POF) is defined as the compression at which the first significant break occurs in the normalized texture profile analysis, stress versus strain curve. The Force at the Point of Fracture (FAPOF) is defined as the stress corresponding to the POF. Samples of the C-gel matrix and the Beef Analog C-Gel product were also examined by transmission electron microscopy and light microscopy.

Figure 8:
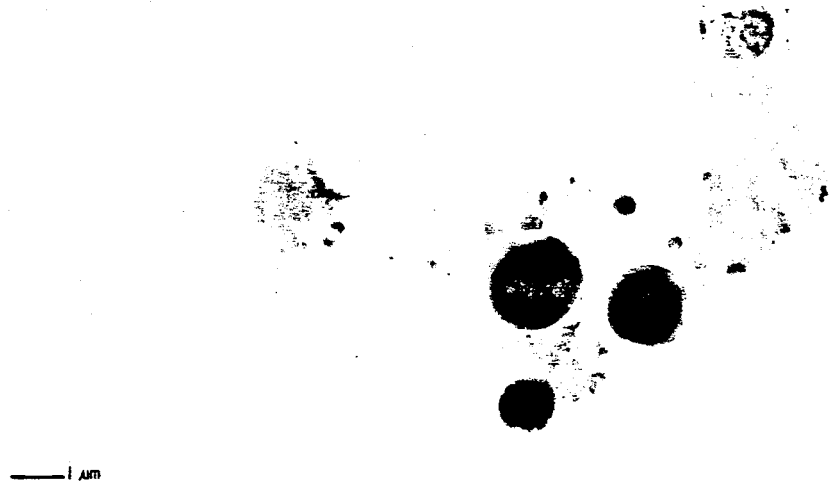
FIG. 8 is a transmission electron photomicrograph of the C-Gel matrix of FIG. 1 at a magnification of 13,000.
Figure 9:
FIG. 9 is a transmission electron photomicrograph of the C-Gel fiber composite product of FIG. 3 at a magnification of 13,000 for comparison with FIG. 8.

FIG. 8 is a transmission electron photomicrograph of the C-gel matrix at a magnification of 13,000, and FIG. 9 is a transmission electron photomicrograph of the beef analog C-gel fiber composite at a magnification of 13,000 for comparison with FIG. 8.

Figure 10:
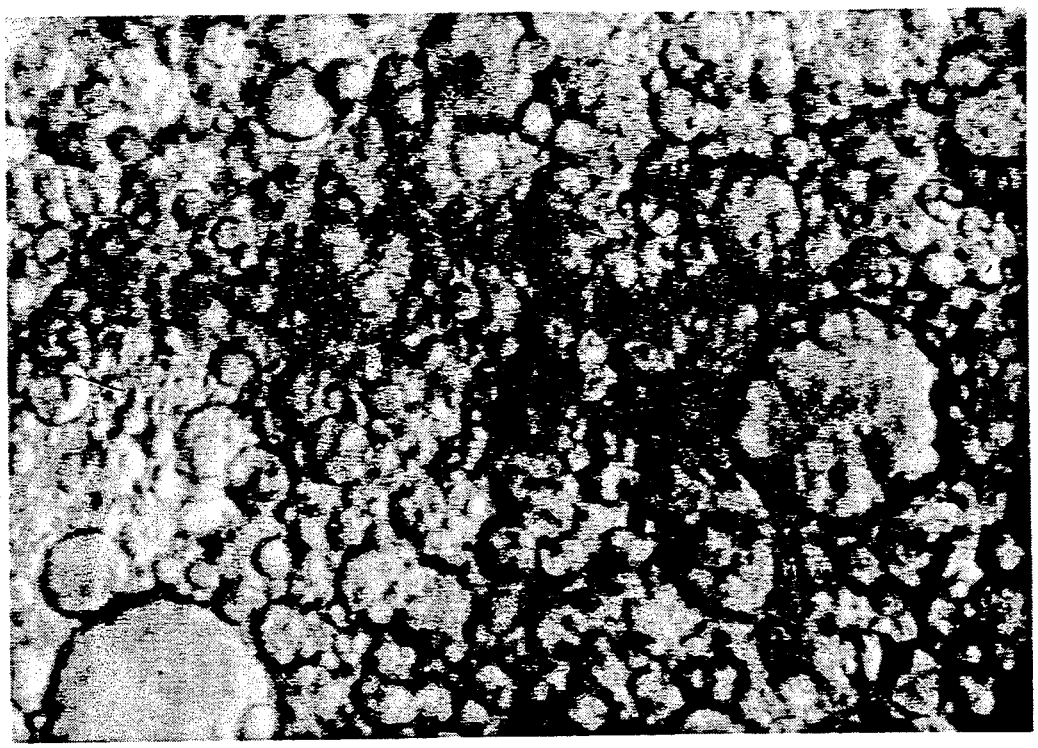
FIG. 10 is a photomicrograph of the C-Gel matrix of FIG. 1 at a magnification of 200, and FIG. 11 photomicrograph of the C-Gel fiber composite product of FIG. 3 at a magnification of 200 for comparison with FIG. 10.
Figure 11:
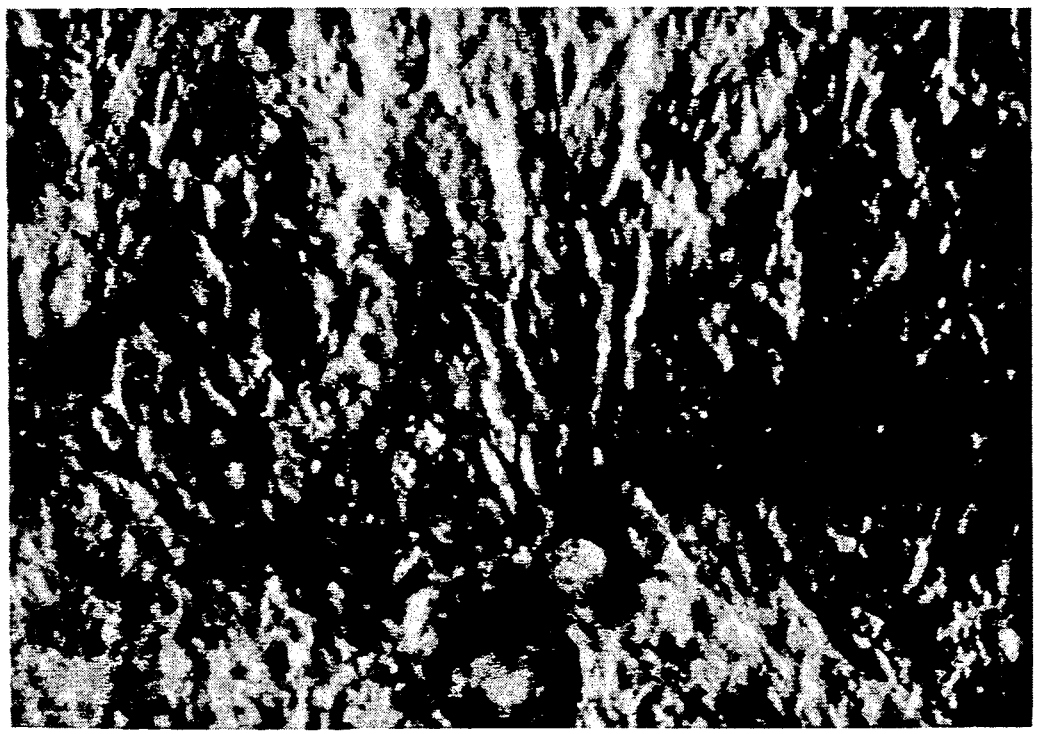

Similarly, FIG. 10 is a photomicrograph of the C-gel matrix at a magnification of 200, and FIG. 11 is a photomicrograph of the beef analog C-gel fiber composite product at a magnification of 200 for comparison with FIG. 10, illustrating its fibrous texture.

Having described certain physical parameters of specific embodiments of a C-Gel matrix and a C-Gel protein fiber composite food product, the invention will be further described with respect to specific, preferred embodiments of C-Gel composite food products. A number of tomato-containing C-Gel composite food products, which may be utilized as hot or cold sandwich components or the like, may be prepared in accordance with the present invention, as illustrated by the following examples:

EXAMPLE 2

A pizza sauce C-Gel composite was prepared from the following ingredients:

| Ingredients | % | Grams |
|---|---|---|
| Gelatin (250 Bloom) | 4.5 | 108.0 |
| Kappa Carrageenan | 1.5 | 36.0 |
| Partially hydrogenated soybean oil (margarine type fat, liquid at 100° F.) | 4.75 | 114.0 |
| Non-Fat Dry Milk | 3.00 | 72.0 |
| Pizza Spice Blend | 2.50 | 60.0 |
| Sorbic Acid | 0.25 | 6.0 |
| Sucrose | 2.75 | 66.0 |
| Tomato paste | 50.0 | 1200.0 |
| Water | 20.0 | 480.0 |
| Sodium Chloride | 2.25 | 54.0 |
| Steam Condensate | 8.50 | 204.0 |
|  | 100.0% | 2400.0 |

The pizza sauce C-Gel composite product was prepared in a manner similar to that used to prepare the composite product of Example 1. In this regard, a premix was prepared by blending the above ingredients in the descending order shown, through and including the sodium chloride. Tomato paste typically contains about 75 percent by weight water. The blended components of the pre-mix were heated with stirring by direct steam injection to 180° F., with the steam condensate, as shown, being incorporated into the heated product. During the heating step, the carrageenan and gelatin were fully dispersed throughout the aqueous plane of the product, and the product was fully pasteurized. The heated product was then poured into a 5-pound loaf form and placed in a 42° F. cooler. After the product was fully cooled, it was subsequently sliced in a conventional meat slicer to provide rectangular pizza sauce slices of about 3-½"×3-1/2"×⅛" dimension. The cooled product exhibited excellent slicing characteristics.

The slices were tested together with a pre-baked pizza crust of dimension 4-½"×4-½"×⅛" and a mozzarella/provalone cheese slice of similar dimension to the composite C-Gel pizza sauce slices. These components, together with the C-Gel pizza sauce slice, formed a convenience food pizza snack kit. The crust, cheese slice and C-Gel pizza sauce slice may each be individually wrapped to preserve freshness, and combined in a pizza kit package. To use the C-Gel pizza sauce pizza kit components, the cold C-Gel pizza sauce slice was placed atop the crust, and the cold mozzarella/provalone cheese slice was placed atop the pizza sauce slice. The layered components were subsequently heated for 45 seconds in a microwave oven (or alternatively for 4 minutes in a 400° F. horizontal toaster oven) to melt the sauce and cheese slices. The resulting pizza snack had excellent flavor and texture. Accordingly, it will be appreciated that the C-Gel pizza slice product and pizza kit of this example provides a means by which a consumer may rapidly and conveniently prepare a fresh, hot pizza snack.

The present invention is also particularly useful for providing meat or meat analog C-Gel composite products having excellent processing, manufacturing and convenience characteristics. In this regard, C-Gel beef, pork, seafood and poultry products may be produced, having a variety of characteristics which are particularly suitable for hot and cold sandwiches, as well as other convenience food applications, as demonstrated by the following examples:

EXAMPLE 3

Two chili C-Gel composite products were prepared, respectively, from the following ingredients:

| Ingredients | Weight % | Grams |
|---|---|---|
| C-Gel Chili Product No. 1 | | |
| Partially hydrogenated soybean oil (margarine type fat, liquid at 100° F.) | 4.75 | 114.0 |
| Kappa Carrageenan | 1.00 | 24.0 |
| Gelatin (250 Bloom) | 4.00 | 96.00 |
| Sorbic Acid | .25 | 6.0 |
| Chili Sauce* | 82.00 | 1968.0 |
| Steam Condensate | 8.00 | 192.0 |
| | 100.00 | 2400.0 |

*Hormel Brand Beef Chili without beans

| Ingredients | Weight % | Grams |
|---|---|---|
| C-Gel Chili Product No. 2 | | |
| Partially hydrogenated soybean oil (margarine type fat, liquid at 100° F.) | 4.75 | 114.0 |
| Carrageenan GP911 | 1.50 | 36.0 |
| Gelatin (40 Mesh) | 3.50 | 84.0 |
| Sorbic Acid | 0.25 | 6.0 |
| Chili Sauce* | 90.00 | 2160.0 |
| | 100.00 | 2400.0 |

*Kraft Brand Chili Hot Dog Sauce with Meat (Beef)

The composite C-Gel chili product No. 1 was prepared in substantially the same manner as the product of Example 2, with blending of the ingredients in the order shown, followed by direct steam injection with mixing to heat the blend to 175° F., followed by cooling in loaf form. The composite C-Gel product No. 2 was prepared in a similar manner, except that the blended components were heated indirectly by steam to 180° F. with stirring, and the heated product was cooled to 42° F. in a 2-½" diameter cylindrical casing, rather than in rectangular loaf form. Both products sliced readily on a conventional meat slicer.

Slices of each product were placed in contact with a double meat patty hamburger. The slices were easily melted by placing the hamburger-chili slice assembly in a microwave oven for 40-45 seconds to rapidly and conveniently produce a "chili burger" having excellent taste characteristics.

EXAMPLE 4

A tomato solids containing barbeque sauce C-Gel composite product was prepared having the following ingredients:

| Ingredients | Weight % | Grams |
|---|---|---|
| Partially hydrogenated soybean oil (margarine type fat, liquid at 100° F.) | 4.25 | 102.0 |
| Kappa Carrageenan GP911 | 2.00 | 48.0 |
| Gelatin (250 Bloom) | 3.50 | 84.0 |
| Non Fat Dry Milk | 1.50 | 36.0 |
| Sorbic Acid | 0.25 | 6.0 |
| BBQ Sauce (pH 4.05)* | 80.00 | 1920.0 |
| Steam Condensate | 8.50 | 204.0 |
| | 100.00 | 2400.0 |

*Acid-reduced Kraft Bulls-Eye Brand BBQ Sauce

The BBQ sauce C-Gel product was prepared in a manner substantially the same as the Pizza sauce product of Example 2. After cooling overnight at 42° F., the cooled loaf product was sliceable, but it was softer in texture than the pizza sauce product of Example 2. The slices are suitable for rapid melting on hot dogs, chicken, pork or other products which advantageously may utilize a BBQ sauce. Firmness of the product may be increased by using higher levels of carrageenan/gelatin, if desired.

EXAMPLE 5

A composite C-Gel roast beef product with BBQ sauce was prepared containing the following ingredients:

| Roast Beef with C-Gel BBQ Sauce | | |
|---|---|---|
| Ingredients | Percent | Grams |
| Kappa Carrageenan GP911 | 1.50 | 36.0 |
| Gelatin (40 Mesh) | 2.00 | 48.0 |
| Partially hydrogenated soybean oil (margarine type fat, liquid at 100° F.) | 2.00 | 48.0 |
| Non-Fat Dry Milk | 1.50 | 36.0 |
| Sorbic Acid | 0.25 | 6.0 |
| 4 Amino Acid Mixture | 0.25 | 6.0 |
| Vegetable Salt | 1.00 | 24.0 |
| Acid Reduced Kraft Bull's Eye BBQ Sauce | 31.00 | 744.0 |
| Steam Condensate | 8.00 | 192.0 |
| Roast Beef (¼" × ¼" × ¼" pieces) | 52.50 | 1260.0 |
| | 100.00 | 2400.0 |

This product was prepared by blending the listed ingredients in descending order through and including the BBQ sauce component to form a pre-mix. The pre-mix was heated by direct steam injection to a temperature of 105°-130° F., followed by addition of the meat piece with continued steam heating and mixing to a temperature of 180°-185° F. The heated composite product was placed, in 5-pound loaf form, in a cooler at 42° F. It was noted that the heated product had proper fluidity for a hot pack system, such as shown in FIG. 7. However, the cooled product sliced well on a meat slicer and had very good beef and BBQ sauce flavor when eaten cold. Slices were heated for 25-45 seconds on a slice of bread, or for 6 minutes in a 400° F. horizontal toaster oven to conveniently provide a hot BBQ beef sandwich.

EXAMPLE 6

A composite C-Gel roast pork product with BBQ sauce was prepared from the following ingredients:

| Roast Pork with C-Gel BBQ Sauce | | |
|---|---|---|
| Ingredients | Weight Percent | Grams |
| Kappa Carrageenan | 1.00 | 24.0 |
| Gelatin (250 Bloom) | 1.50 | 36.0 |
| Partially hydrogenated soybean oil (margarine type fat, liquid at 100° F.) | 1.50 | 36.0 |
| Non-Fat Dry Milk | 1.50 | 36.0 |
| Sorbic Acid | 0.25 | 6.0 |
| 4 Amino Acid Mixture | 0.25 | 6.0 |
| Vegetable Salt | 1.00 | 24.0 |
| Acid-Reduced Kraft Bull's Eye BBQ Sauce | 25.00 | 600.0 |
| Steam Condensate | 8.00 | 192.0 |
| Roast Pork (¼" × ¼" × ¼" pieces)* | 60.00 | 1440.0 |
| | 100.00 | 2400.0 |

A pre-mix was prepared in the same manner as in Example 5 by first blending the top 3 ingredients together, then mixing in the next 4 ingredients, and finally blending in BBQ Sauce. The pre-mix and about half of the roast pork were steam heated to about 130° F., the rest of the pork was added to the cooker, and the final cook temperature was 186° F. After stirring to 175° F., the batch (which had suitable fluidity for a hot pack system) was poured into a 5 lb. loaf and placed in a 42° F. cooler.

The cooled product sliced adequately on a meat slicer. The slices had good flavor, both cold and after heating on white bread for 25-45 seconds in a microwave oven or 6 minutes at 400° F. in a horizontal toaster oven.

EXAMPLE 7

A composite C-Gel product containing pre-fried bacon bits was prepared from the following components:

| C-Gel Fried Bacon Bits Product | | |
|---|---|---|
| Ingredients | % | Grams |
| Kappa Carrageenan | 1.00 | 24.0 |
| Gelatin (250 Bloom) | 2.00 | 48.0 |
| Partially hydrogenated soybean oil (margarine type fat, liquid at 100° F.) | 4.00 | 96.0 |
| Buttermilk Powder | 5.00 | 120.0 |
| Sorbic Acid | 0.25 | 6.0 |
| 4 Amino Acid Mixture | 0.25 | 6.0 |
| Vegetable Salt | 0.50 | 12.0 |
| Water | 33.00 | 792.0 |
| Lactic Acid (85%) | 0.25 | 6.0 |
| Sodium Citrate | 0.75 | 18.0 |
| Steam Condensate | 8.00 | 192.0 |
| Rendered Bacon Bits (pre-fried) | 45.0 | 1080.0 |
| | 100.0 | 2400.0 |

A pre-mix was prepared by blending the top three ingredients, and then blending in each ingredient in descending order through and including the sodium citrate. The pre-mix was then heated by direct steam injection with gradual addition of the rendered bacon bits, to a temperature of 175° F. to provide a heated, pumpable blend which was poured into a 5-pound loaf form and placed in a cooler at 42° F. After cooling, the product was found to have a pH of about 5.75, and sliced well on an automatic meat slicer. The product had very good flavor when eaten cold.

A slice of the product was also heated in buttered bread on a grill with a slice of process cheese to prepare a grilled cheese and bacon sandwich also having very good flavor. The cold strength of the product may be increased, if desired, by increasing the content of carrageenan and gelatin.

EXAMPLE 8

A number of sliceable products were prepared employing various meat products dispersed in a C-Gel composite cheese sauce base. The C-Gel cheese sauce base had the following composition:

| Ingredients | Total Product Weight % | Grams |
|---|---|---|
| Partially hydrogenated soybean oil (margarine type fat, liquid at 100° F.) | 2.00 | 280.0 |
| Kappa Carrageenan | 0.75 | 105.0 |
| Gelatin (40 Mesh) | 1.50 | 210.0 |
| Non Fat Dry Milk | 3.00 | 420.0 |
| Sorbic Acid | 0.20 | 28.0 |
| 4 Amino Acid Mixture | 0.10 | 14.0 |
| Mild American Cheese | 15.00 | 2100.0 |
| Water | 7.00 | 980.0 |
| Thawed Lemon Juice | 0.75 | 105.0 |
| Lactic Acid (85%) | 0.20 | 28.0 |
| Sodium Citrate | 0.50 | 70.0 |
| Sodium Chloride | 0.50 | 70.0 |
| | 31.50 | 4410.0 |

For each different product, 40 weight percent of the above listed C-Gel base cheese sauce components (including steam heating condensate) was combined with 60 weight percent of a meat product component, to provide respective product compositions, as follows:

| Ingredients | Weight % | Grams |
|---|---|---|
| Turkey in Cheese Sauce Product | | |
| Above Cheese Sauce Pre-mix | 31.50 | 756.0 |
| Steam Condensate | 8.50 | 204.0 |
| Shredded Turkey (Cooked) | 60.00 | 1440.0 |
| | 100.00 | 2400.0 |
| Baked Ham/Turkey in Cheese Sauce Product | | |
| Above Cheese Sauce Pre-mix | 31.50 | 756.0 |
| Steam Condensate | 8.50 | 204.0 |
| Shredded Turkey (Cooked) | 30.00 | 720.0 |
| Shredded Baked Ham | 30.00 | 720.0 |
| | 100.00 | 2400.0 |
| Bologona in Cheese Sauce Product | | |
| Above Cheese Sauce Pre-mix | 31.50 | 756.0 |
| Steam Condensate | 8.50 | 204.0 |
| Shredded Cooked Bologna | 60.00 | 1440.0 |
| | 100.00 | 2400.0 |
| Salmon in Cheese Sauce Product | | |
| Above Pre-mix | 31.50 | 756.0 |
| Steam Condensate | 8.50 | 204.0 |
| Canned Red Salmon Pieces | 60.00 | 1440.0 |
| | 100.00 | 2400.0 |
| Salami in Cheese Sauce Product | | |
| Above Pre-mix | 31.50 | 756.0 |
| Steam Condensate | 8.50 | 204.0 |
| Shredded Cured Salami | 60.00 | 1440.0 |

| Ingredients | Weight % | Grams |
|---|---|---|
| | 100.00 | 2400.0 |

Each product was prepared by blending the base cheese sauce pre-mix ingredients in the descending order shown, followed by direct steam injection heating. The meat component was added with stirring as the temperature reached about 120°–130° F., with a final cook temperature of 180° F. The heated products were filled into 5-pound loaf forms and cooled to 42° F. in a cooler. All of the products were readily sliceable by a conventional meat slicer to provide slices which could be eaten cold, or after heating.

EXAMPLE 9

A chicken with gravy C-Gel composite product was prepared to further demonstrate the utility of the invention in respect to poultry-containing products. In this regard, a product was prepared having the following composition:

| Chicken with Gravy C-Gel Product | | |
|---|---|---|
| Ingredients | Weight % | Grams |
| Partially hydrogenated soybean oil (margarine type fat, liquid at 100° F.) | 4.25 | 102.0 |
| Kappa Carrageenan | 1.50 | 36.0 |
| Gelatin (250 Bloom) | 3.50 | 84.0 |
| Sorbic Acid | 0.25 | 6.0 |
| Canned Chicken Spread (diced chicken and gravy) | 82.00 | 1968.0 |
| Steam Condensate | 8.50 | 204.0 |
| | 100.00 | 2400.0 |

The product was prepared in a manner similar to the previous example by blending the top 4 ingredients together. Then about 1/4 of the chicken spread was mixed in to complete the pre-mix. The rest of the chicken spread was gradually added to the cooker during steam heating to 180° F. The heated product was filled into a 5 lb. loaf form at 175° F. and subsequently cooled to 42° F. The cooled product was sliceable and suitable for use in sandwiches.

EXAMPLE 10

A C-Gel product having a variety of different components including prepared meatballs with pineapple and gravy was prepared in a manner similar to the previous examples. The ingredients of this product were:

| Ingredients | % | Grams |
|---|---|---|
| Kappa Carrageenan | 1.00 | 24.0 |
| Partially hydrogenated soybean oil (margarine type fat, liquid at 100° F.) | 2.75 | 66.0 |
| Gelatin (250 Bloom) | 2.50 | 60.0 |
| Sorbic Acid | 0.25 | 6.0 |
| Gravy (from Meatballs) | 16.67 | 400.0 |
| Steam Condensate | 8.50 | 204.0 |
| Canned Crushed Pineapple | 10.00 | 240.0 |
| Quartered Meat Balls | 58.33 | 1400.0 |
| | 100.00 | 2400.0 |

The top 5 ingredients were blended together, in descending order to form a pre-mix. The pre-mix and the crushed pineapple were steam heated to 130° F., then the meat balls were gradually added with continued steam heating until 180° F. was reached. The heated C-Gel product blend was filled into a 5 lb. loaf at 175° F., and cooled to 42° F. to provide a sliceable product suitable for sandwiches.

As indicated by Example 8, seafood-containing C-Gel products may be provided which have very desirable manufacturing, convenience and flavor characteristics. The following additional examples of seafood products further illustrate the range of dispersed food components which may be provided in C-Gel matrices to provide novel food products in accordance with the present invention.

EXAMPLE 11

A crab analog product was manufactured, using individually wrapped hot pack equipment, having the following composition:

| Shredded Crab Analog - C-Gel Cheese Sauce | | |
|---|---|---|
| Ingredients | Weight % | Lbs. |
| Partially hydrogenated soybean oil (margarine type fat liquid at 100° F.) | 2.00 | 0.80 |
| Kappa Carrageenan | 0.75 | 0.30 |
| Gelatin (250 Bloom) | 1.50 | 0.60 |
| Non Fat Dry Milk | 3.00 | 1.20 |
| Sorbic Acid | 0.20 | 0.08 |
| 4 Amino Acid Mixture | 0.10 | 0.04 |
| Mild American Cheese | 15.00 | 6.00 |
| Water | 7.00 | 2.80 |
| Thawed Lemon Juice | 0.75 | 0.30 |
| Lactic Acid (85%) | 0.20 | 0.08 |
| Sodium Citrate | 0.50 | 0.20 |
| Sodium Chloride | 0.50 | 0.20 |
| Steam Condensate | 8.50 | 3.40 |
| Crab-Flavored Surimi | 60.00 | 24.00 |
| | 100.00 | 40.00 |

The crab-flavored surimi was cut in a Urschel RA Dicer set to give a 1/16"×⅛"×⅛" shred and run at high speed. A pre-mix was prepared by mixing each ingredient together with the others in descending order (up to the steam condensate). Direct steam and mixing were applied to the pre-mix. When the temperature reached about 120°–130° F., the shredded crab flavored surimi was gradually added to the cooker. The final cook temperature was 176° F. The well emulsified product was readily packaged and cooled in a hot pack packaging apparatus of the type illustrated in FIG. 7 with about 1.25 oz. (36 grams) per individually wrapped slice. The final product had good flavor both cold and melted over a toasted, buttered English muffin, and excellent storage stability.

EXAMPLE 12

A crab analog C-Gel composite product in seafood cocktail sauce was prepared having the following composition:

| Ingredients | % | Grams |
|---|---|---|
| Partially hydrogenated soybean oil (margarine type fat, liquid at 100° F.) | 2.69 | 64.56 |
| Kappa Carrageenan | 1.00 | 24.00 |
| Kappa-Lambda Carrageenan Mixture (2:1 weight ratio, approx.) | 1.00 | 24.00 |
| Gelatin (250 Bloom) | 1.00 | 24.00 |

-continued

| Ingredients | % | Grams |
|---|---|---|
| Non-Fat Dry Milk | 1.50 | 36.00 |
| Vitamin E and Related Tocopherols | 0.01 | 0.24 |
| Sorbic Acid | 0.30 | 7.20 |
| Mustard Flour | 0.50 | 12.00 |
| Seafood Cocktail Sauce (Crosse and Blackwell) | 20.00 | 480.00 |
| Lemon Juice | 2.50 | 60.00 |
| Citric Acid | 0.25 | 6.00 |
| Vegetable Salt | 1.25 | 30.00 |
| Steam Condensate | 8.00 | 192.00 |
| Crab-Flavored Surimi | 60.00 | 1440.00 |
|  | 100.00 | 2400.00 |

The product was prepared in a manner similar to Example 10 by blending the ingredients in the order listed. The pre-mix and about ⅓ of the surimi crab analog were mixed and steam heated to about 120° F., the remainder of the surimi was gradually added. After heating to 180° F., the product was filled into a 5-pound loaf form at 175° F. and subsequently cooled at 42° F. The cooled product is sliceable and has excellent flavor.

EXAMPLE 13

A tuna salad seafood product was prepared from the following ingredients:

| C-Gel Tuna Salad | | |
|---|---|---|
| Ingredients | Weight Percent | Grams |
| Kappa Carrageenan | 1.00 | 24.00 |
| Kappa-Lambda Carrageenan Mixture (2:1 weight ratio, approx.) | 1.00 | 24.00 |
| Partially hydrogenated soybean oil (margarine type fat, liquid at 100° F.) | 2.74 | 65.76 |
| Gelatin (250 Bloom) | 1.00 | 24.00 |
| Vitamin E and Related Tocopherols | 0.01 | 0.24 |
| Sorbic Acid | 0.25 | 6.00 |
| Vegetable Salt | 1.00 | 24.00 |
| Canned Tuna Juice | 10.00 | 240.00 |
| Lemon Juice | 1.00 | 24.00 |
| Citric Acid | 0.50 | 12.00 |
| Diced Celery (¼" × ¼" × ¼") | 13.50 | 324.00 |
| Drained Fragmented Tuna | 50.00 | 1200.00 |
| Mayonnaise | 10.00 | 240.00 |
| Steam Condensate | 8.00 | 192.00 |
|  | 100.00 | 2400.00 |

A pre-mix was prepared for the above product by mixing the ingredients together in the descending order shown, including about 3/4 of the tuna meat. Direct steam heat and stirring were applied to the pre-mix. During heating the remainder of the tuna was added to the blend. The final cook temperature was 180° F. The product was poured into a 5 lb. loaf at 175° F. and stored at 42° F.

The cooled product was readily sliced in a meat slicer. The resulting slices were made into cold tuna salad sandwiches having excellent flavor.

C-Gel composite products comprising a dispersed flavored fat base are particularly desirable products. The following examples describe C-Gel fat based products and methods for preparing such products.

EXAMPLE 14

Slices of a yogurt-cream cheese C-Gel product were manufactured by IW hot pack equipment, having the following composition:

| Yogurt - Cream Cheese - C-Gel Hot Pack Slices | | |
|---|---|---|
| Ingredients | Weight % | Pounds |
| Anhydrous Butterfat (melted) | 10.0 | 2.00 |
| Gelatin (250 Bloom) | 2.5 | 0.50 |
| Kappa Carrageenan | 1.3 | 0.26 |
| Buttermilk Powder | 5.5 | 1.10 |
| Sorbic Acid | 0.2 | 0.04 |
| High (20%) Solids Yogurt | 40.0 | 8.00 |
| Sodium Citrate | 2.0 | 0.40 |
| Sodium Chloride | 0.5 | 0.10 |
| Cream Cheese | 30.0 | 6.00 |
| Steam Condensate | 8.0 | 1.60 |
|  | 100.0 | 20.00 |

Two 20 lb. pre-mixes (minus the condensate) were prepared from the above formula by first blending the top 5 ingredients together and then blending in the yogurt, sodium citrate, salt, and cream cheese (in order). The two pre-mixes were mixed together and steam heated to 175° F. in a cooker. The batch was recycled to 168° F. and it was very smooth. Then it was packaged and cooled in a hot pack system such as illustrated in FIG. 7, to provide individually wrapped slices of a yogurt-cream cheese C-Gel composite product. The final cooled product had a desirable yogurt flavor and texture.

After equilibration in a cooler for several days, the above product had a pH of 5.31 and 56.72% moisture.

EXAMPLE 15

Individually wrapped slices of a chocolate-flavored C-Gel product was prepared in a manner similar to Example 14, having the following composition:

| Chocolate Flavored C-Gel | | |
|---|---|---|
| Ingredients | Weight % | Lbs. |
| Gelatin (250 Bloom) | 2.0 | 1.50 |
| Kappa Carrageenan | 1.0 | 0.75 |
| Anhydrous Butterfat at 100° F. | 3.00 | 2.25 |
| Sodium Chloride | 0.4 | 0.30 |
| Water | 26.0 | 19.50 |
| Buttermilk Powder | 8.0 | 6.00 |
| Emulsifier (Atmos 150) | 0.4 | 0.30 |
| Sorbic Acid | 0.2 | 0.15 |
| Condensate | 9.0 | 6.75 |
| Nestle's Broc. Milk Chocolate (in pieces) | 50.0 | 37.50 |
|  | 100.0 | 75.00 |

The product was prepared by blending the ingredients (down through the Sorbic Acid) in the descending order shown and transferring the non-chocolate components to an 80-lb. laydown cooker. Direct steam and mixing were applied. After the temperature rose to about 120° F. the chocolate pieces were gradually added to the cooker. The steam heating was continued throughout the chocolate addition and was finally stopped at 175° F. A portion of the batch was packaged in an apparatus such as shown in FIG. 7 to provide individually wrapped slices of the chocolate-flavored product. Another portion of the product was automatically packaged into a wrapped, stick form, 5" long and 5/8" in diameter. The finished products were quite smooth and had a delicious chocolate flavor.

EXAMPLE 16

A C-Gel salad dressing product was prepared from the following ingredients:

| C-Gel Salad Dressing Slices | | |
|---|---|---|
| Ingredients | Weight Percent | Grams |
| Kappa Carrageenan | 2.000 | 48.0 |
| Gelatin (250 Bloom) | 3.500 | 84.0 |
| Soybean Oil | 26.000 | 624.0 |
| Liquid Egg Yolks (Past.-Salted) | 4.500 | 108.0 |
| Paprika (Ground) | 0.0125 | 0.3 |
| Oleoresin Black Pepper | 0.0125 | 0.3 |
| Spice Mix | 0.100 | 2.4 |
| Water } Pre Blend | 38.125 | 915.0 |
| Vinegar, White 120 grain | 5.000 | 120.0 |
| Sucrose | 11.250 | 270.0 |
| NaCl | 1.500 | 36.0 |
| Steam Condensate | 8.000 | 192.0 |
| | 100.000 | 2400.0 |

A pre-mix was made for the above product by first blending the top 3 ingredients together and then mixing in each ingredient (except the condensate) in the descending order shown.

The pre-mix was stirred and steam heated to 171° F. The very fluid product set-up rapidly when cooled. It was poured into a 5 lb. loaf and placed in a 42° F. cooler. It had a pH of 4.01.

The C-Gel salad dressing product had a firm, rubbery texture, sliced very well on a meat slicer, and had an excellent flavor.

EXAMPLE 17

A chocolate cream cheese flavored C-Gel composite product was prepared from the following components:

| Chocolate Cream Cheese Flavored C-Gel Product | | |
|---|---|---|
| Ingredients | % | Grams |
| Gelatin (250 Bloom) | 1.50 | 36.0 |
| Kappa Carrageenan | 0.75 | 18.0 |
| Emulsifier (Atmos 150) | 0.25 | 6.0 |
| Sorbic Acid | 0.25 | 6.0 |
| Buttermilk Powder | 2.00 | 48.0 |
| Partially hydrogenated soybean oil (margarine type fat, liquid at 100 F.) | 4.25 | 102.0 |
| Cream Cheese | 37.00 | 888.0 |
| Steam Condensate | 9.00 | 225.0 |
| Nestle's Broc. Chocolate | 45.00 | 1080.0 |
| | 100.00 | 2500.0 |

The product was prepared by blending the ingredients together (down through the cream cheese) in the descending order shown to form a pre-mix. The pre-mix was steam heated to 180 F. During the cooking, the chocolate pieces were added to the cooker. The product was sealed in a 5 pound loaf and cooled to 42° F. The product sliced well and had excellent flavor.

C-Gel composite products which contain natural fruit are particularly desirable novel products. The following examples illustrate a variety of different C-Gel fruit products.

EXAMPLE 18

An excellent banana flavored C-Gel composite product was prepared from the following ingredients:

| Banana C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.20 | 305.0 |
| Frozen Banana Puree w/20% sucrose | 64.00 | 1600.0 |
| Nat. Banana Flavor | 0.30 | 7.5 |
| Steam Condensate | 9.00 | 225.0 |
| | 100.00 | 2500.0 |

The product was prepared by blending together the ingredients in the order shown. The blend was cooked to 180° F., stirred to 172° F. and jelled into a 5 lb loaf form in a 42° F. cooler, as previously described. The product slices well and has an excellent flavor.

EXAMPLE 19

An excellent apple-flavored C-Gel product was prepared in the same manner as in Example 18, from the following ingredients:

| Apple C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.20 | 305.0 |
| Apple Pie Filling (Thank You) | 64.00 | 1600.0 |
| Nat. Apple flavor | 0.30 | 7.5 |
| Steam Condensate | 9.00 | 225.0 |
| | 100.00 | 2500.0 |

EXAMPLE 20

An excellent mandarin orange flavored C-Gel composite product was prepared in the manner of Example 18, having the following ingredients:

| Mandarin Orange Flavored C-Gel Product | | |
|---|---|---|
| Ingredients | Weight % | Grams |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.00 | 300.0 |
| Mandarin Orange Base (Dunkirk) | 64.00 | 1600.0 |
| Mandarin Orange Flavor | 0.50 | 12.5 |

| Mandarin Orange Flavored C-Gel Product | | |
| --- | --- | --- |
| Ingredients | Weight % | Grams |
| Steam Condensate | 9.00 | 225.0 |
| | 100.00 | 2500.0 |

EXAMPLE 21

An excellent pineapple-flavored C-Gel product was prepared in a manner like that of Example 18 from the following ingredients:

| Pineapple Flavored C-Gel Product | | |
| --- | --- | --- |
| Ingredients | Weight % | Gram |
| Gelatin (250 Bloom) | 3.00 | 75.0 |
| Kappa Carrageenan | 1.30 | 32.5 |
| Emulsifier (Atmos 150) | 0.50 | 12.5 |
| Sorbic Acid | 0.30 | 7.5 |
| Buttermilk Powder | 9.00 | 225.0 |
| Sodium Chloride | 0.40 | 10.0 |
| Partially hydrogenated soybean oil (margarine type fat, liquid at 100° F.) | 12.00 | 300.0 |
| Pineapple Cottage Cheese Base | 62.50 | 1562.5 |
| Pineapple Booster Flavor | 2.00 | 50.0 |
| Steam Condensate | 9.00 | 225.0 |
| | 100.00 | 2500.0 |

EXAMPLE 22

| Red Raspberry-Flavored C-Gel Slices and Sticks | | |
| --- | --- | --- |
| Ingredients | Weight % | Pounds |
| Gelatin (250 Bloom) | 2.5 | 2.00 |
| Kappa Carrageenan | 1.2 | 0.96 |
| Emulsifier (Atmos 150) | 0.5 | 0.40 |
| Sorbic Acid | 0.3 | 0.24 |
| Buttermilk Powder | 9.5 | 7.60 |
| Partially hydrogenated soybean oil (margarine type fat, liquid at 100° F.) | 12.4 | 9.92 |
| Red Raspberry Yogurt Flavor (59.5% solids) | 50.0 | 40.00 |
| Petran Red Raspberry Sherbet Raspberry Booster Flavor | 2.0 | 1.60 |
| Water | 12.0 | 9.60 |
| Citric Acid | 0.2 | 0.16 |
| Sodium Chloride | 0.4 | 0.32 |
| Condensate | 9.0 | 7.20 |
| | 100.0 | 80.00 |

A pre-mix was prepared for this product by blending the top 5 ingredients and the oil together in a large Hobart mixer. These ingredients were then mixed with the raspberry base and booster flavor in a mixer. Finally, the citric acid-water solution and the salt were blended into the other ingredients. The batch was steam heated to 175° F., recycled to 165° F., and packaged in the hot pack system of FIG. 7. The final cooled, individually wrapped product slices had excellent flavor and a soft texture. Hot pack sticks were also made, of the type previously described.

EXAMPLE 23

Wrapped, peach flavored C-Gel slices were made from the following ingredients:

| Peach-Flavored C-Gel 1W Slices | | |
| --- | --- | --- |
| Ingredients | % | Pounds |
| Anhydrous Butterfat (100 F.) | 12.0 | 2.40 |
| Gelatin (250 Bloom) | 3.0 | 0.60 |
| Kappa Carrageenan | 1.3 | 0.26 |
| Emulsifier (Atmos 150) | 0.5 | 0.10 |
| Sorbic Acid | 0.3 | 0.06 |
| Buttermilk Powder | 9.0 | 1.80 |
| Peach Yogurt Flavor | 61.5 | 12.30 |
| Natural Peach Booster Flavor | 3.0 | 0.60 |
| Sodium Chloride | 0.4 | 0.08 |
| Steam Condensate | 9.0 | 1.80 |
| | 100.0 | 20.00 |

Enough pre-mix material was prepared in each of 2 Hobart mixers to make two-20-lb. batches by first blending together the top 6 ingredients and then blending in the peach base, the booster flavor, and the sodium chloride, in order. The 2 pre-blends were combined in a 40-lb. cooker and were steam heated to 175° F., mixed to 165° F., and packaged in the hot pack system of FIG. 7. After cooling, this product was a little weak in peach flavor, perhaps a little too sweet, and was a little soft in texture. These characteristics may readily be improved by formulation modification.

EXAMPLE 24

Individually wrapped slices of a strawberry-cream cheese C-gel product were prepared from the following components:

| Strawberry-Cream Cheese Flavored C-Gel 1W Slices | | |
| --- | --- | --- |
| Ingredients | % | Pounds |
| Anhydrous Butterfat (100 F.) | 8.00 | 1.60 |
| Gelatin (250 Bloom) | 2.00 | 0.40 |
| Kappa Carrageenan | 1.00 | 0.20 |
| Buttermilk Powder | 7.00 | 1.40 |
| Strawberry Yogurt Base Flavor | 30.00 | 6.00 |
| Natural Strawberry Booster Flavor | 2.00 | 0.40 |
| Sodium Citrate | 0.70 | 0.14 |
| Cream cheese (cool) | 40.00 | 8.00 |
| Sorbic Acid | 0.30 | 0.06 |
| Steam Condensate | 9.00 | 1.80 |
| | 100.00 | 20.00 |

The top 4 ingredients were blended together, followed by the last 5 ingredients, in order (the Na citrate was added before the cream cheese). Two pre-blends were made and combined, cooked, and packaged exactly as described with respect to Example 23.

After cooling, this product had very good strawberry-cream cheese flavor. The texture may be adjusted by replacing 0.5% of gelatin by 0.5% of buttermilk powder.

EXAMPLE 25

As described in Example 1, xanthan-protein fibers may be utilized in a C-gel matrix to produce novel food products. In this regard, a pineapple food product with desirable texture provided by synthetic fibers was prepared from the following components:

Pineapple Fiber C-Gel Product

| | Weight % | Grams |
|---|---|---|
| Partially hydrogenated soybean oil (margarine type fat, liquid at 100 F.) | 4.00 | 96.0 |
| Kappa Carrageenan | 1.50 | 36.0 |
| Gelatin (250 Bloom) | 2.50 | 60.0 |
| Non Fat Dry Milk | 6.00 | 144.0 |
| Sorbic Acid | 0.25 | 6.0 |
| 4 Amino Acid Mixture | 0.20 | 4.8 |
| Thawed Pineapple Concentrate (60% solids) | 25.00 | 600.0 |
| Pineapple flavoring | 7.58 | 182.0 |
| Crushed Pineapple (drained) | 25.00 | 600.0 |
| Thawed Lemon Juice | 0.75 | 18.0 |
| Lactic Acid (85%) | 0.30 | 7.2 |
| Sodium Citrate | 1.00 | 24.0 |
| Sodium Chloride | 1.00 | 24.0 |
| Steam Condensate | 8.00 | 192.0 |
| Short Synthetic Protein Fibers (as described in example 1) | 16.92 | 406.0 |
| | 100.00 | 2400.0 |

The product was prepared generally as described in Example 1, and had excellent slicing, texture and flavor characteristics.

EXAMPLE 26

A chicken-flavored C-Gel product was prepared using synthetic protein fibers as described in Example 1, with the following ingredients:

Chicken Flavored Protein Fiber C-Gel Product

| Ingredients | | Percent | Grams |
|---|---|---|---|
| Kappa Carrageenan | | 1.50 | 36.0 |
| Gelatin (250 Bloom) | | 3.00 | 72.0 |
| Rendered Chicken Fat (melted) | | 7.50 | 180.0 |
| Chicken Flavoring | | 1.00 | 24.0 |
| Non-Fat Dry Milk | | 6.00 | 144.0 |
| Sorbic Acid | | 0.25 | 6.0 |
| 4 Amino Acid Mixture | | 0.25 | 6.0 |
| Mild American Cheese | | 25.00 | 600.0 |
| Water | Pre-disperse together | 24.50 | 588.0 |
| Thawed Lemon Juice | | 0.70 | 16.8 |
| Lactic Acid (85%) | | 0.30 | 7.2 |
| Sodium Citrate | | 1.00 | 24.0 |
| Vegetable Salt | | 1.00 | 24.0 |
| Steam Condensate | | 8.00 | 192.0 |
| Short Synthetic Protein Fibers (as described in Example 1) | | 20.00 | 480.0 |
| | | 100.00 | 2400.0 |

The product was prepared by first blending the top 3 ingredients together and then mixing in the remaining ingredients, in the descending order shown down through the vegetable flavored salt, to complete the pre-mix. Steam and mixing were applied to the pre-mix. The synthetic protein fibers were gradually added to the cooker in the temperature range of 140°–150° F. The final cook temperature was 180° F. The well emulsified batch was stirred to 175° F., poured into a 5 lb. loaf, and cooled to 42° F. The product had excellent clean chicken flavor and a nice chicken texture.

Although the invention has been described in considerable detail with reference to certain preferred embodiments thereof, it will be understood that variations and modifications can be affected within the spirit and scope of the invention as described above and as defined in the appended claims.

What is claimed is:

1. A pizza snack kit for preparation of a heated pizza snack, comprising:

at least one slice of a thermoreversible C-gel pizza sauce composite product which may be readily melted when heated, comprising a structurally firm, continuous phase gelatin-carrageenan matrix comprising at least about 0.5 weight percent kappa carrageenan, at least about 1.0 weight percent gelatin having a bloom strength of at least about 125, at least about 20 weight percent of pizza sauce components, and from about 30 to about 80 weight percent of water, based on total product weight, said carrageenan and said gelatin being present in a continuous carrageenangelatin phase which is structurally firm at refrigeration temperature and which is mobile at a temperature of 160° F., with said pizza sauce components being dispersed in said continuous carrageenan-gelatin phase, a prepackaged cheese topping; and at least one prepackaged baked pizza crust, such that a consumer may place said at least one structurally firm C-gel pizza sauce slice product on said baked pizza crust and said cheese topping on said structurally firm C-gel slice and heat the crust, slice and cheese topping in an oven to produce a heated pizza snack.

2. A C-gel pizza sauce kit in accordance with claim 1 wherein said C-gel slice comprises about 50 weight percent of tomato paste.

3. A G-gel pizza sauce kit in accordance with claim 1 wherein said continuous carrageenan-gelatin phase has a pH in the range of from about 4.0 to about 6.0.

4. A C-gel pizza sauce kit in accordance with claim 1 wherein said gelatin has a bloom strength of at least about 200.

5. A C-gel pizza product in accordance with claim 1 wherein said C-gel matrix component of the composite slice has a structural fracturability of at least about 1 kilogram per square centimeter at 45° F.

6. A C-gel pizza product in accordance with claim 1 wherein said cheese topping is a mozzarella or provalone topping.

* * * * *